(12) United States Patent
Bharadwaj et al.

(10) Patent No.: US 11,936,483 B2
(45) Date of Patent: Mar. 19, 2024

(54) HARQ FEEDBACK FOR MULTICAST/UNICAST

(71) Applicant: QUALCOMM Incorporated, San Diego, CA (US)

(72) Inventors: Arjun Bharadwaj, Cupertino, CA (US); Kapil Gulati, Belle Mead, NJ (US); Sudhir Kumar Baghel, Pleasanton, CA (US); Shailesh Patil, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/063,622

(22) Filed: Dec. 8, 2022

(65) Prior Publication Data

US 2023/0113638 A1 Apr. 13, 2023

Related U.S. Application Data

(62) Division of application No. 16/578,027, filed on Sep. 20, 2019, now Pat. No. 11,601,228.

(Continued)

(51) Int. Cl.
*H04L 1/1829* (2023.01)
*H04L 1/1812* (2023.01)
(Continued)

(52) U.S. Cl.
CPC .......... *H04L 1/1861* (2013.01); *H04L 1/1812* (2013.01); *H04L 1/1854* (2013.01); *H04L 5/0055* (2013.01); *H04L 5/14* (2013.01)

(58) Field of Classification Search
None
See application file for complete search history.

(56) References Cited

U.S. PATENT DOCUMENTS 7,995,462 B2  8/2011  Gao et al.
2005/0138671 A1  6/2005  Love et al.
(Continued)

FOREIGN PATENT DOCUMENTS

CN  103988559 A  8/2014
EP  3364591 A1  8/2018
(Continued)

OTHER PUBLICATIONS

International Search Report and Written Opinion—PCT/US2019/052438—ISA/EPO—dated Mar. 19, 2020.

(Continued)

*Primary Examiner* — Walter J Divito
(74) *Attorney, Agent, or Firm* — Procopio, Cory, Hargreaves & Savitch LLP

(57) ABSTRACT

In an aspect of the disclosure, a method, a computer-readable medium, and an apparatus are provided. The apparatus may be a UE. The apparatus may receive from a second device a first data packet in one or more receiving slots of a time division duplex frame that includes a plurality of slots. The apparatus may determine whether the first data packet is received incorrectly. The apparatus may wait until the end of the one or more receiving slots and may transmit to the second device a first NACK in a NACK feedback symbol in a configured slot after the end of the one or more receiving slots in response to determining that the first data packet was not received correctly.

30 Claims, 19 Drawing Sheets

Related U.S. Application Data

(60) Provisional application No. 62/738,804, filed on Sep. 28, 2018.

(51) Int. Cl.
  *H04L 5/00* (2006.01)
  *H04L 5/14* (2006.01)

(56) References Cited

U.S. PATENT DOCUMENTS

| | | |
|---|---|---|
| 2015/0049708 A1 | 2/2015 | Damnjanovic et al. |
| 2016/0020891 A1 | 1/2016 | Jung et al. |
| 2016/0218849 A1 | 7/2016 | Bertrand et al. |
| 2016/0262137 A1 | 9/2016 | Behravan et al. |
| 2016/0353475 A1 | 12/2016 | Au et al. |
| 2018/0035435 A1 | 2/2018 | Gupta et al. |
| 2018/0254877 A1 | 9/2018 | Wang et al. |
| 2019/0045529 A1 | 2/2019 | Xiong et al. |
| 2020/0099476 A1 | 3/2020 | Park |
| 2020/0106567 A1 | 4/2020 | Bharadwaj et al. |
| 2020/0221460 A1 | 7/2020 | Berggren et al. |

FOREIGN PATENT DOCUMENTS

| | | |
|---|---|---|
| TW | 201831021 A | 8/2018 |
| WO | 2013144905 A1 | 10/2013 |
| WO | 2017000240 A1 | 1/2017 |
| WO | 2018119378 A1 | 6/2018 |
| WO | 2018131922 A1 | 7/2018 |

OTHER PUBLICATIONS

International Preliminary Report on Patentability—PCT/US2019/052438, The International Bureau of WIPO—Geneva, Switzerland, dated Aug. 4, 2021.
Partial International Search Report—PCT/US2019/052438—ISA/EPO—dated Dec. 12, 2019.
Taiwan Search Report—108134198—TIPO—dated Sep. 30, 2022.
Qualcomm Incorporated: "General consideration on TDD design", R1-1718148, 3GPP TSG-RAN WG1 #90bis, Oct. 9-13, 2017, Prague, Czechia, pp. 1-3.
European Search Report—EP23201825—Search Authority—The Hague—dated Jan. 2, 2024.
Huawei., et al., "NR Frame Structure and Scheduling on Unlicensed Bands", 3GPP TSG RAN WG1 Meeting #92 bis, R1-1803678, 3rd Generation Partnership Project, Mobile Competence Centre, 650, Route Des Lucioles, F-06921 Sophia-Antipolis Cedex, France, Sanya, China, Apr. 16-Apr. 20, 2018, Apr. 20, 2018, 8 pages, figure 1, sections 2, 4.

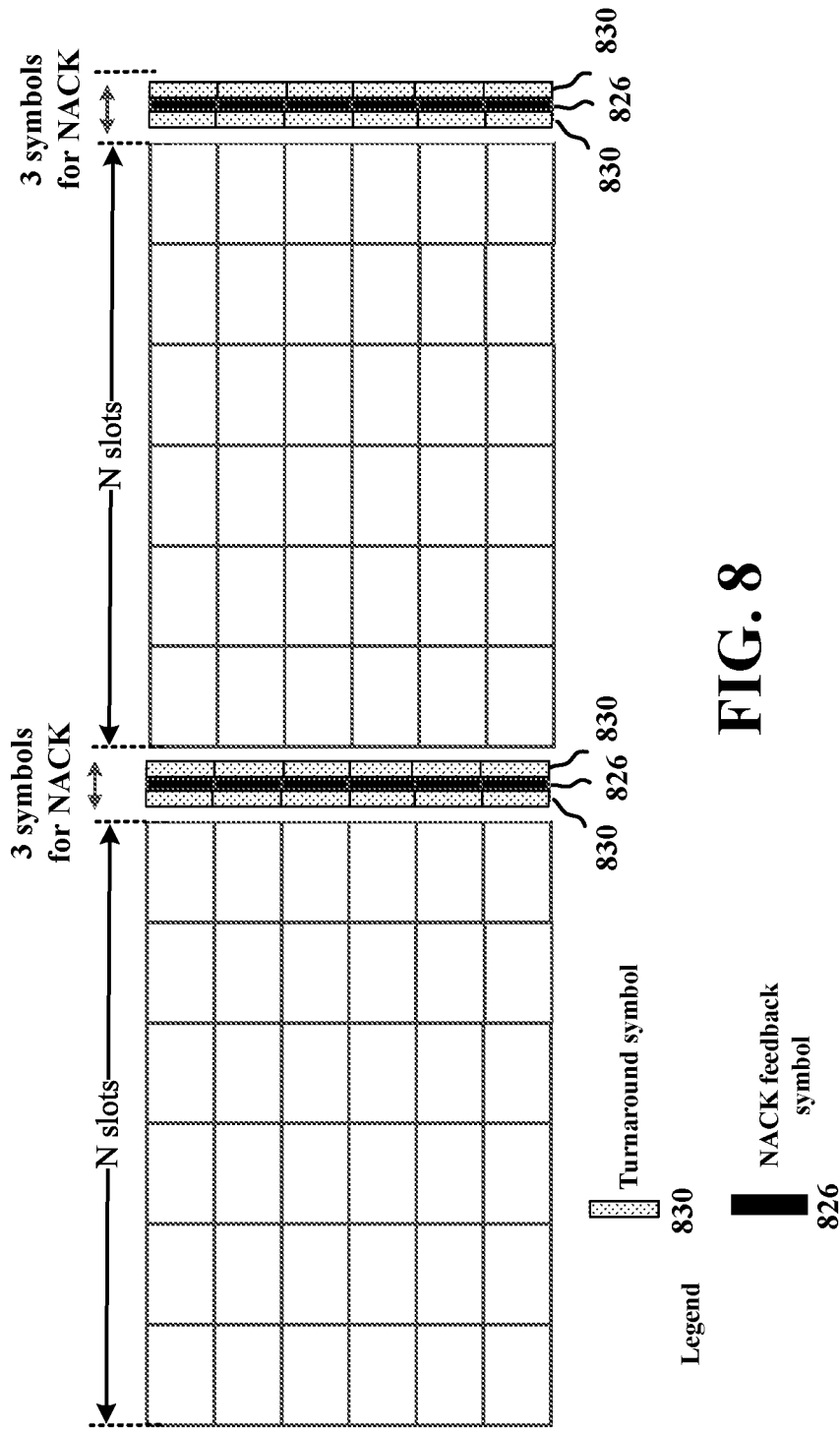

| Parameter | #bits |
|-----------|-------|
| NACK | 1 |
| RI | 2 |
| PMI | 4 |
| CQI | 5 |
| Total | 12 |

HARQ FEEDBACK FOR MULTICAST/UNICAST

CROSS-REFERENCE TO RELATED APPLICATION(S)

This application is a Divisional of U.S. Non-provisional application Ser. No. 16/578,027, entitled "HARQ FEEDBACK FOR MULTICAST/UNICAST" and filed on Sep. 20, 2019, which claims the benefit of U.S. Provisional Application Ser. No. 62/738,804, entitled "HARQ Feedback for Multicast/Unicast" and filed on Sep. 28, 2018, which are expressly incorporated by reference herein in their entirety.

INTRODUCTION

The present disclosure relates generally to communication systems, and more particularly, to methods and systems for vehicle to vehicle (V2V), Vehicle to Everything (V2X) communication, and/or other Device-to-Device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). Another example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR technology may facilitate autonomous vehicles by enabling communication between vehicles (V2V), as well as other types of vehicle communication such as vehicle to network (V2N), vehicle to infrastructure (V2I), vehicle to pedestrian (V2P), etc., all of which may broadly be categorized as vehicle to everything (V2X) communication. Some aspects of 5G NR may be based on the 4G Long Term Evolution (LTE) standard. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication by a first device. In certain configurations, the apparatus may be a User Equipment (UE). The apparatus may receive from a second device a first data packet in one or more receiving slots of a time division duplex frame. The apparatus may determine whether the first data packet is received incorrectly. The apparatus may wait until the end of the one or more receiving slots and may transmit to the second device a first negative acknowledgement signal (NACK) in a NACK feedback symbol in a slot after the end of the one or more receiving slots in response to determining that the first data packet was not received correctly.

In an aspect of the disclosure, a method, a computer-readable medium, and an apparatus are provided for wireless communication by a first device. The apparatus may contend for use of one or more slots of a Time Division Duplex (TDD) frame for transmitting, wherein each slot of the one or more slots includes a plurality of symbols. The apparatus may transmit at least a portion of a first packet in one or more transmitting slots. The apparatus may reserve a first feedback symbol of a first transmitting slot of the one or more transmitting slots for reception of a NACK from the one or more device. The apparatus may refrain from transmitting the first packet during the feedback symbol of the first transmitting slot.

In an aspect of the disclosure, a method, a computer-readable medium, and an apparatus are provided for wireless communication by a first device. The apparatus receives from a second device a first data packet in one or more receiving slots of a time division duplex frame and determines whether the first data packet is received incorrectly. The apparatus waits until a set of dedicated symbols to transmit a first negative acknowledgement signal (NACK). The apparatus transmits to the second device the first NACK in a NACK feedback symbol in the set of dedicated symbols after the end of the one or more receiving slots in response to determining that the first data packet is received incorrectly.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating transmissions of NACKs for HARQ-feedback in dedicated NACK symbols after every N slots in accordance with certain aspects of the disclosure.

FIG. 10 illustrates feedback channels containing NACKs for multicast and unicast transmissions in accordance with certain aspects of the disclosure.

DETAILED DESCRIPTION

Figure 1:
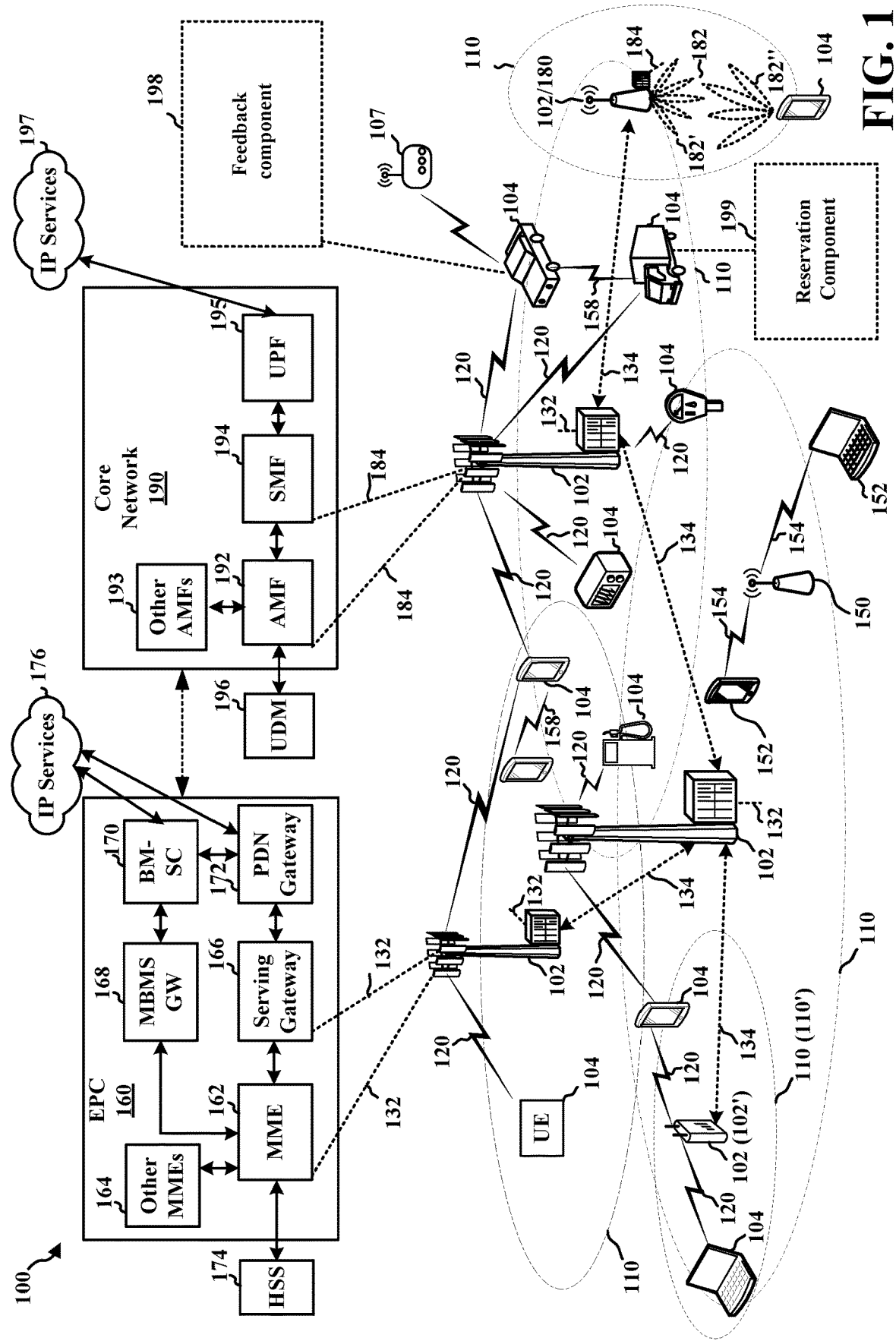
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more base stations 102, such as macro base station. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. A mmW base station, such as base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or other D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

In certain aspects, a UE 104 may receive from a second device a first data packet in one or more receiving slots of a time division duplex frame that includes a plurality of slots. The apparatus may determine whether the first data packet is received incorrectly. The apparatus may include a feedback component 198 that is configured to wait until the end of the one or more receiving slots before transmitting a NACK in a NACK feedback symbol in a configured slot in response to determining that the first data packet was not received correctly.

In other aspects, UE 104 may contend for use of one or more slots of a plurality of slots of a TDD frame for transmitting, wherein each slot includes a plurality of symbols. The apparatus may transmit a first packet to one or more devices in one or more transmitting slots. The apparatus may include a reservation component 199 configured to reserve a feedback symbol of a transmitting slot of the one or more transmitting slots for feedback from the one or more devices. The apparatus may refrain from transmitting the first packet during the feedback symbol of the transmitting slot.

Figure 2:
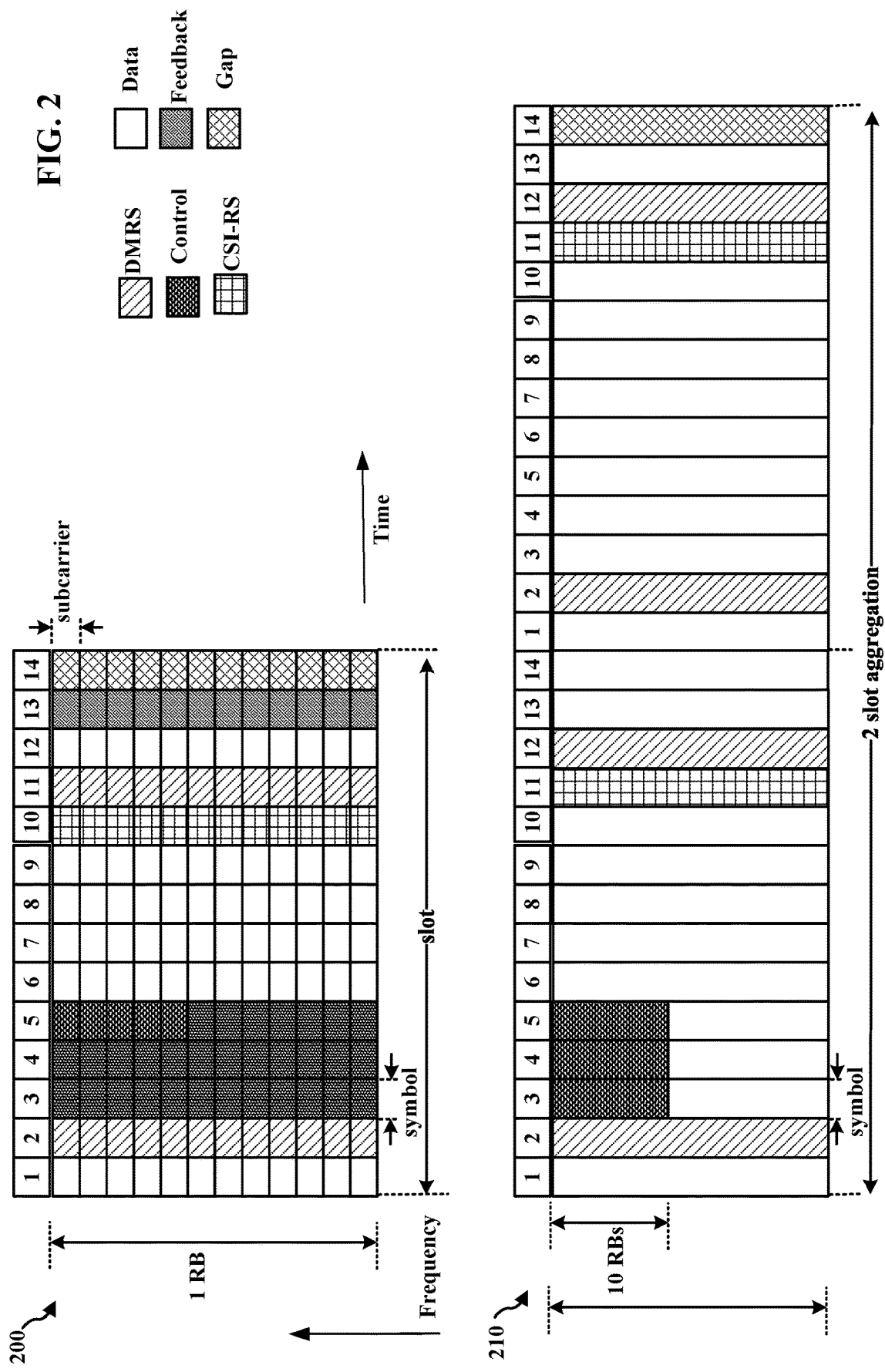
FIG. 2 illustrates examples of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
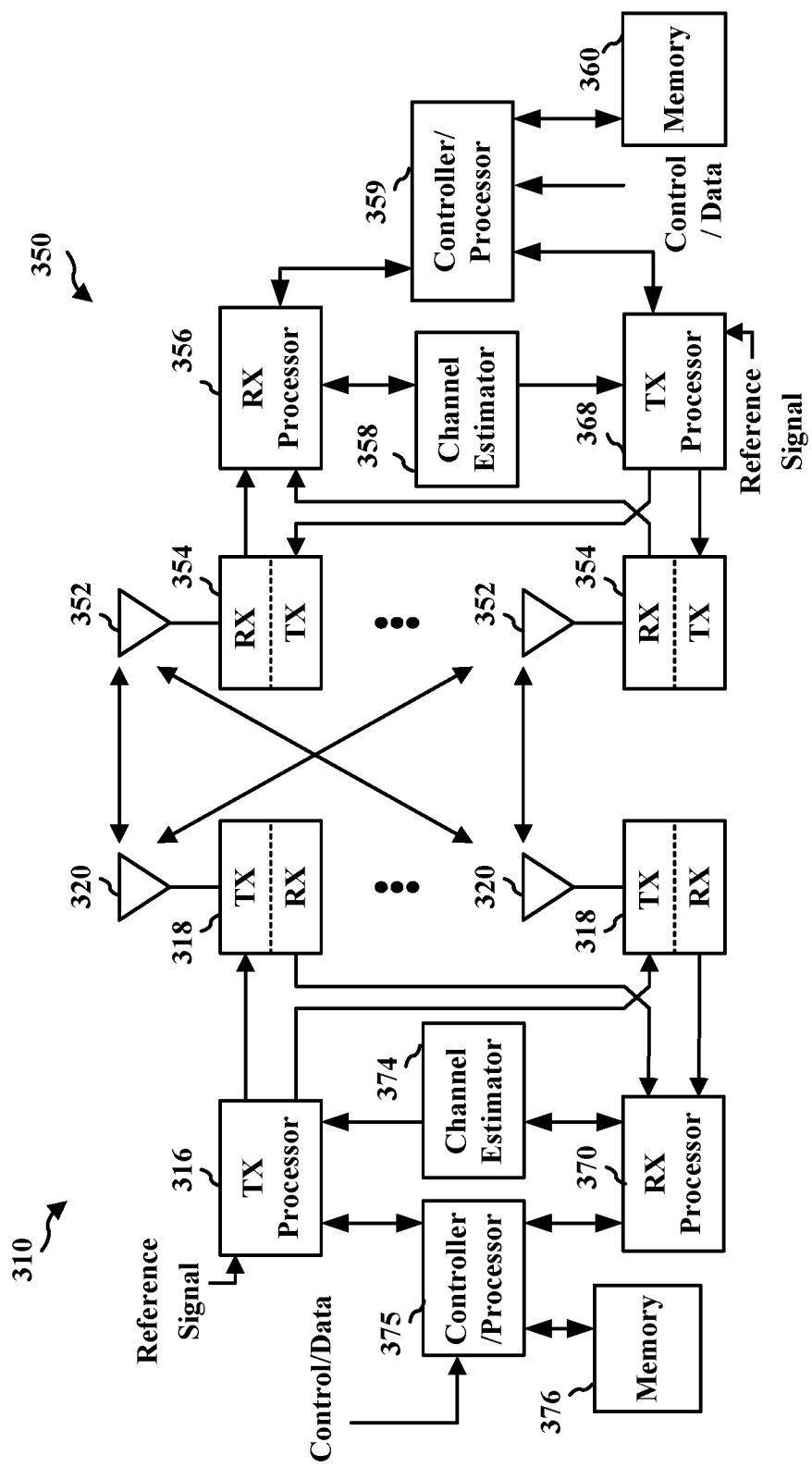
FIG. 3 is a diagram illustrating an example of a base station and user equipment (UE) in an access network.

FIG. 3 is a block diagram of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 and/or 199 of FIG. 1.

Figure 4:
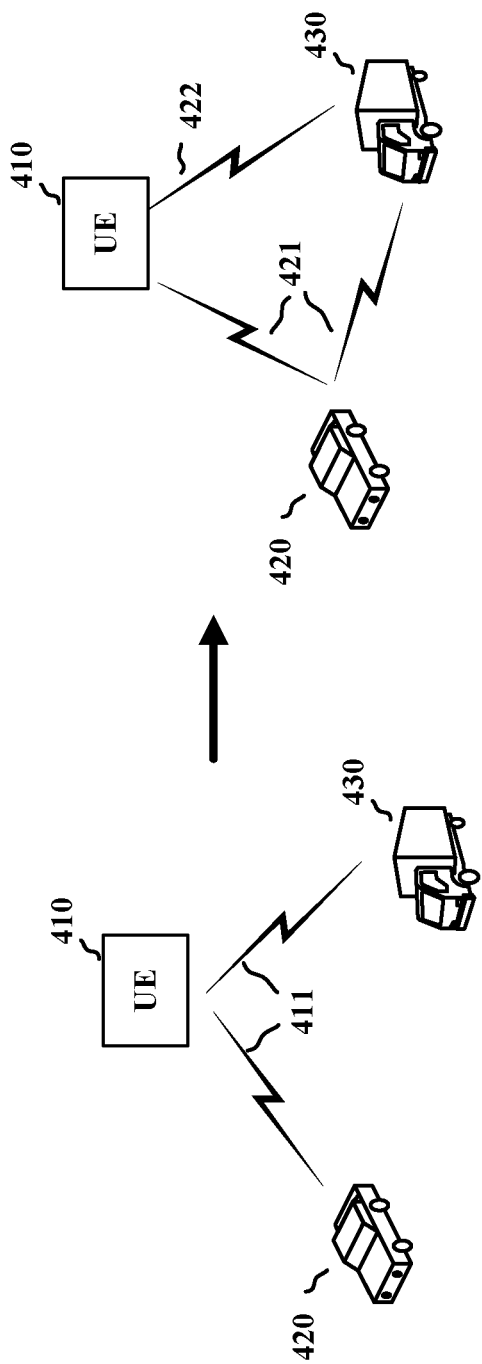
FIG. 4A, FIG. 4B, and FIG. 4C are diagrams illustrating multicast transmission of data packets between UEs in accordance with certain aspects of the disclosure.

FIGS. 4A, 4B, and 4C are diagrams illustrating multicast transmission of data packets between UEs in accordance with certain aspects of the disclosure. V2V/V2X/D2D communication may be implemented in a decentralized manner without relying on a base station to coordinate the communication. Each UE may contend for transmission resources and may take turns assuming the role of a transmitting UE during one or more slots and receiving during other slots. For example, in FIG. 4A, a first UE 410 may acquire the transmission resources for one or more slots to transmit its sensor data as a data packet in a multicast transmission 411 to a second UE 420 and a third UE 430. A second UE 420 or a third UE 430 may decode the data packet and if the data packet is not decoded correctly (e.g., fails a cyclic redundancy check (CRC)), second UE 420 or third UE 430 may transmit a NACK feedback to first UE 410. Second UE 420 or third UE 430 may transmit the NACK after the slots during which the data packet was received.

FIG. 4B illustrates a scenario in which second UE 420 contends and acquires the transmission resources for one or more slots to transmit its sensor data as a data packet in a multicast transmission 421 after first UE 410 has finished its transmission. If third UE 430 did not correctly decode the data packet from the first UE 410 during the multicast transmission 411 of FIG. 4A, the third UE 430 may transmit a NACK 422 to the first UE 410 in the slots during which the multicast transmission 421 is received from the second UE 420. In one aspect, a feedback symbol in a slot of the one or more slots used by the second UE 420 for the multicast transmission 421 may be reserved for any UEs to transmit a NACK. During the feedback symbol, the second UE 420 may refrain from transmitting the multicast transmission 421. The third UE 430 may use this reserved feedback symbol to transmit the NACK 422 to the first UE 410. In one aspect, the third UE may transmit the NACK 422 as a broadcast packet. The third UE 430 may switch from a receiving mode to a transmitting mode to transmit the NACK 422 using the reserved feedback symbol. The third UE 430 may then switch from the transmitting mode back to the receiving mode to resume receiving the multicast transmission 421 from the second UE 420. During the switching between the receiving and transmitting modes, the third UE 430 may puncture data received from the multicast transmission 421. The first UE 410 may receive the NACK 422 in the reserved feedback symbol indicating that the third UE 430 did not receive correctly the data packet transmitted during the multicast transmission 411. The first UE 410 may retransmit its data packet by contending for the transmission resources after the second UE completes its multicast transmission 421.

FIG. 4C illustrates a second scenario in which the second UE 420 contends and acquires the transmission resources for one or more slots for the multicast transmission 421 of its data packet after the first UE 410 has finished its transmission. In this scenario, the second UE 420 did not decode correctly the data packet transmitted from the first UE 410 during the multicast transmission 411 of FIG. 4A. The second UE 420 may use the reserved feedback symbol during its multicast transmission 421 to transmit a NACK to the first UE 410. Because the second UE 420 is already the transmitting UE, the second UE 420 need not switch between the receiving and transmitting modes. After transmitting the NACK using the reserved feedback symbol, the second UE 420 may resume transmitting its data packet for the remainder of its one or more slots. The first UE 410, upon receiving the NACK, may retransmit its data packet by contending for the transmission resources after the second UE completes its multicast transmission 421.

FIGS. 4A, 4B, and 4C illustrate certain aspects of the disclosure using multicast transmission of data packets between UEs in V2V, V2X, or other D2D communication, e.g., using unicast, multicast, broadcast, or other protocols. While the examples illustrate communication between UEs, the aspects presented herein may also be performed by other types of UEs, a Road Side Unit (RSU), or base station engaged in V2V, V2X, and/or other D2D communication.

Figure 5:
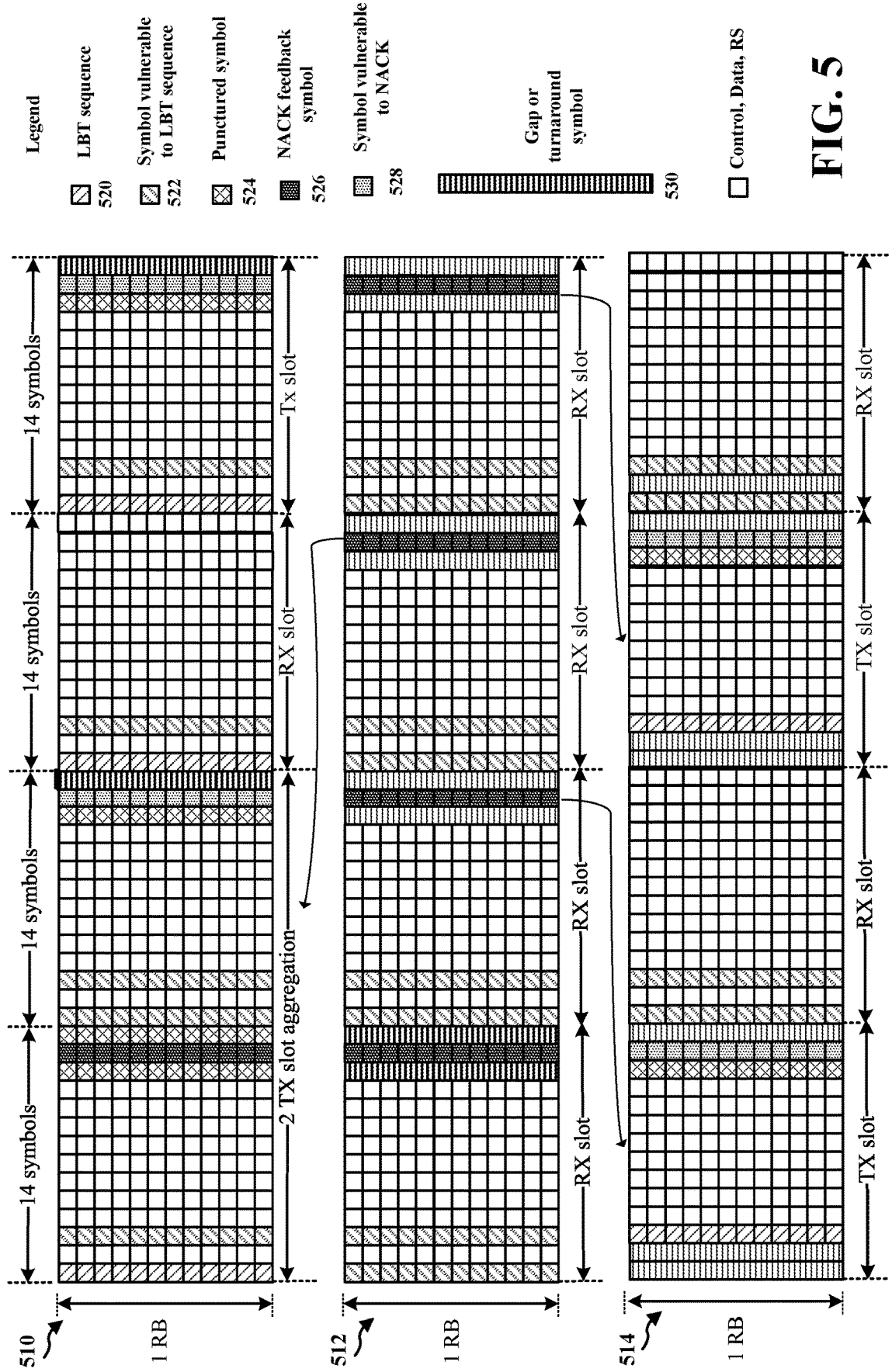
FIG. 5 is a diagram illustrating transmissions of NACKs for HARQ in the $13^{th}$ symbol of a first slot after the end of transmission slots in accordance with certain aspects of the disclosure.

FIG. 5 illustrates an example link level design for TDD communication in which a device does not transmit and receive at the same time. A slot may comprise 14 symbols, as illustrated in FIG. 5. Communication may be performed based on one slot or an aggregation of multiple slots in the link level design.

FIG. 5 is a diagram illustrating transmissions of NACKs for HARQ in the 13$^{th}$ symbol of a first slot following the end of a transmission (e.g., a first transmit slot following a previous transmission) in accordance with certain aspects of the disclosure. Although FIG. 5 illustrates a feedback symbol that occurs in the 13$^{th}$ symbol, it should be understood that other symbols may be used and that the 13$^{th}$ symbol is merely one example location for the feedback symbol. Transmission resources are shown as resource blocks that include 12 carriers in the vertical direction representing frequency and 14 symbols in the horizontal direction representing time. The 14 symbols, labeled as symbols 1-14, may constitute a slot. The number of symbols in a slot may vary. For example, slots with an extended cyclic prefix or other variation may have a different number of symbols. A transmitting device may acquire one or more slots for transmission of a transport block, e.g., based on V2V/V2X/D2D. In one aspect, a transport block may comprise a data packet.

In the four slots depicted in timeline 510, a UE may be in a transmitting mode for a two slot aggregation followed by a slot during which the UE is in the receiving mode, which may then be followed by a slot during which the UE is in the transmitting mode, again. The UE may correspond to any of the UEs illustrated in FIGS. 4A-4C. For example, if first UE 410 has a data packet to transmit, first UE 410 may contend for access to transmission resources by transmitting a listenbefore-talk (LBT) sequence 520 during symbol 1 of the first slot. Other UEs may contend for the transmission resources by transmitting their LBT sequences in other symbols. For a packet transmission based on LBT counter 0, the LBT may be transmitted in the first symbol of the slot. For a packet transmission based on LBT counter 1, the transmitter may wait until the third symbol to transmit the LBT, e.g., as illustrated in timeline 514. The transmitting device may select, e.g., randomly between different LBT counters for each packet transmission. Thus, symbol 3 of a slot may be deemed a vulnerable symbol 522 that may be vulnerable to LBT sequences transmitted by other contending UEs using LBT counter 1. When first UE 410 utilizes the transmission resources, first UE 410 may use one or more slots for transmitting data, control, and RS. For example, as shown in FIG. 5, first UE 410 may transmit control information, reference signals, and/or a data packet in the aggregation of two transmitting slots that includes the first and the second slot.

Symbol 13 of the first slot of the two slot aggregation may be reserved as a NACK feedback symbol 526 for use by UE(s) for transmitting a NACK in response to the UE(s) not being able to correctly decode a data packet received in a previous transmission. For example, if second UE 420 could not correctly decode a data packet received from first UE 410, or from any other transmitting UE, during an aggregation of one or more transmitting slots that precedes the current two slot aggregation in slots 1 and 2, second UE 420 may transmit a NACK during the NACK feedback symbol 526 in symbol 13 of the first slot of the current two slot aggregation. The corresponding slots for the second UE may be illustrated by the timeline of 512. Similarly, if third UE 430 could not correctly decode the data packet received from first UE 410, or any other transmitting UE, for the transmission that precedes the current two slot aggregation, third UE 430 may also transmit a NACK feedback symbol 526 during the NACK feedback symbol 526 in the first slot of the current two slot aggregation.

In another scenario, a third UE 430 may be transmitting in the same slot or slots as the first UE 410, but using a different frequency from the transmitting frequency used by the first UE 410. The slots for the third UE may be illustrated by timeline 514. The third UE 430 may reserve symbol 13 as a NACK feedback symbol for NACK transmission by other UEs, as in UE 410. One or more devices may transmit NACKs on the same NACK feedback symbol. While the third UE 430 may receive NACKs in symbol 13 of the first slot on a different frequency from that used by the first UE 410 to receive NACKs, there may be interference between transmissions of the NACK feedback symbols on the two frequencies. This is because of increased power leakage when multiple UEs transmit NACKs on the same frequency. For the third UE 430, symbol 13 of the first slot is shown as a symbol vulnerable to NACK because of possible interference from the NACK transmitted by the UE 420 on a different frequency in the first slot of the two slot aggregation of the UE 410.

As mentioned, in the timeline 512, a receiving UE such as the second UE 420 may transmit a NACK in the NACK feedback symbol 526. The second UE 420 may receive the transmission from the first UE 410 during symbols 4-11 of the first slot of the two slot aggregation used by the first UE 410 for transmitting. At symbol 12, one symbol before the NACK feedback symbol 526, the second UE 420 may switch from the receiving mode to the transmitting mode using a gap symbol 530. During symbol 12, also referred to as the first turnaround symbol, the first UE 410 may continue to transmit its data packet. In one aspect, the first UE 410 may fill symbols 12 with residual data after performing code rate matching of the data to be transmitted so that the code rate matched data is filled in symbol 12, and also in symbol 14 as will be discussed, after other symbols (e.g., symbols 2, 4-11) carrying the data packet are filled.

In one aspect, the first UE 410 may elect not to transmit on symbols 12 and 14 by performing code rate matching of the data to be transmitted so that only symbols 2 and 4-11 are filled with the data packet. In this scenario, the turnaround symbols used by the UEs transmitting the NACK to transition from the receiving mode to the transmitting mode and then back to the receiving mode may be referred to as punctured symbols at the UE transmitting data packets. As shown in FIG. 5, symbol 12 of the first transmitting slot for the first UE 410 and for the third UE 430 are shown as a punctured symbol 524 because the first UE 410 and the third UE 430 do not transmit their data packets during symbol 12.

During the NACK feedback symbol 526, the first UE 410 refrains from transmitting. The NACK transmitted from the second UE 420 may be received by the first UE 410 to indicate that data packet transmitted in a transmission prior to the current two slot aggregation was not correctly decoded by the second UE 420 if the prior transmission was from the first UE 410. The first UE 410 may contend for transmission resources following the current two slot aggregation to retransmit the data packet that was not successfully decoded by the second UE 420 in a later transmission. In one aspect, if the transmission prior to the current two slot aggregation was from another UE, and if the first UE 410 did not correctly decode the data packet transmitted in the prior transmission, the first UE 410 may transmit a NACK using the NACK feedback symbol 526 to request retransmission from the UE transmitting in the prior transmission.

At symbol 14 of the first slot of the two slot aggregation, one symbol after the NACK feedback symbol 526, the second UE 420 may switch from the transmitting mode back to the receiving mode using another gap symbol 530. In one aspect, during symbol 14, also referred to as the second turnaround symbol, first UE may resume transmitting its data packet. This is because other UEs that do not transmit NACKs during the NACK feedback symbol 526 may continue to receive the data packet from first UE 410 during symbols 12 and 14. To accommodate NACK transmitting UEs, such as UE 420, without compromising the data rate of other UEs that do not transmit NACKs in a slot, first UE 410 may fill symbols 12 and 14 in every slot after all other symbols in the aggregation of transmitting slots are filled with code rate matched data from a buffer. That is, the data packet may not be transmitted in the order of the symbols in the slot. Instead, residual data following code rate matching may be filled in symbols 12 and 14 after the remaining data carrying symbols (e.g., symbols 2, 4-11) in the slot are filled. This may allow for improved efficiency for those devices that are not transmitting NACK feedback.

In the second slot of the two slot aggregation, symbols 1 and 3 may be vulnerable symbols 522 that are vulnerable to LBT sequences transmitted by UEs wishing to gain access to the transmission resources. Because first UE 410 is transmitting for the two slot aggregation, first UE may continue to transmit the data packet during symbols 2 and 4-11 of the second slot. First UE 410 may also transmit the data packet during symbols 12 and 13. As with symbol 12 in the first slot of the two slot aggregation, symbol 12 in the second slot may be filled with residual data following code rate matching after the symbols 2 and 4-11 of in the two transmitting slots are filled. Unlike symbols 13 in the first slot of the two slot aggregation, first UE 410 may use symbol 13 in the second slot to transmit the data packet because first UE 410 does not expect to receive a NACK feedback symbol in the second slot of the two slot aggregation. However, symbol 13 of the second slot may be a symbol 528 vulnerable to NACK transmission from other devices, such as UEs transmitting NACKs on a different frequency. For example, during the second slot, second UE 420 may transmit a NACK in symbol 13 on a different frequency to respond to the data packet transmitted by third UE 430 in the one slot transmission using the first slot. During symbol 14 of the second transmitting slot of the two slot aggregation, first UE 410 may transition from the transmitting mode to a receiving mode by using a gap symbol 530.

At slot 3, after first UE 410 has completed transmitting, UEs may contend for access to the transmission resources by transmitting a LBT sequence 520 during symbol 1 and during symbol 3. For example, as depicted in timeline 514, third UE 430 may transmit an LBT sequence 520 during the third symbol for LBT counter 1 to contend for access to the transmission resources. If third UE 430 utilizes the transmission resources, third UE 430 may use one or more slots for transmitting. For example, third UE 430 may transmit control information, reference signals, and a data packet using slot 3 in a one slot transmission.

Third UE 430 may reserve symbol 13 of its first transmission slot (also its lone transmission slot) for use by any UEs for transmitting a NACK. Third UE 430 may receive the NACK on a different frequency than the frequency used by first UE 410 to receive its NACK. For example, as depicted in timeline 512, if second UE 420 could not correctly decode the data packet transmitted from UE 410 during the previous two slot aggregation, second UE 420 may transmit a NACK during the NACK feedback symbol 526 of the slot 3 to first UE 410 on a different frequency from the frequency used by third UE 430 to receive its NACK. During symbols 4-11 of the slot 3, second UE 420 may receive transmission from other UEs. At symbol 12, second UE 420 may switch from the receiving mode to the transmitting mode using a gap symbol 530 to prepare for transmitting the NACK.

During symbol 13 of slot 3, third UE may refrain from transmitting. The NACK transmitted from second UE 420 may be received by first UE 410 to indicate that the data packet transmitted during the previous two slot aggregation was not correctly decoded by second UE 420. First UE 410 may contend for transmission resources following the one slot transmission by third UE 430 to retransmit the data packet. Any NACKs received by third UE 430 on the symbol 528 may be vulnerable to interference from the NACK transmitted by second UE 420 on the different frequency if there is sufficient power leakage.

At symbol 14 of slot 3, second UE 420 may switch from the transmitting mode back to the receiving mode. During the same symbol, third UE 430 may terminate transmitting by using a gap symbol 530.

During slot 4, UEs may contend for access to the transmission resources by transmitting a LBT sequence 520 during symbol 1 and during symbol 3. First UE 410 may utilize the transmission resources for a one slot transmission.

Again, first UE 410 reserve symbol 13 of its first slot of the one slot transmission for use by any UEs for transmitting a NACK if any UEs were unable to correctly decode the data packet received in the previous transmission. As depicted in timeline 512, if second UE 420 could not correctly decode the data packet transmitted from third UE 430 during the previous transmission, second UE 420 may transmit a NACK during the NACK feedback symbol 526 slot 4. However, second UE 420 may transmit the NACK to third UE 430 on a different frequency than that used by UE 410 to receive its NACK.

During symbol 13 of the transmission slot of first UE 410 in slot 4, first UE 410 refrains from transmitting. The NACK transmitted from second UE 420 may be received by third UE 430 to indicate that the data packet transmitted during the previous one slot transmission slot was not correctly decoded by second UE 420. Third UE 430 may contend for transmission resources following the one slot transmission by first UE 410 to retransmit the data packet. At symbol 14 of the transmission of first UE 410, second UE 420 may switch from the transmitting mode back to the receiving mode. During the same symbol, first UE 410 may terminate transmitting by using a gap symbol 530.

In FIG. 5, symbol 13 of the first transmission slot after the end of a previous transmission may be reserved for the NACK feedback symbol 526. In one aspect, the symbol number and the number of slots between the end of the previous transmission and the NACK transmission maybe configurable. For example, if additional decoding time is needed by receiving UEs to decode a data packet received in the previous transmission, the NACK feedback symbol 526 may be moved to the second or a subsequent slot after the end of the previous transmission. In one aspect, if a receiving UE has a NACK to transmit, the receiving UE may not contend for the transmission resources until the receiving UE transmits the NACK. For example, if second UE 420 has data packets to transmit and wishes to acquire the transmission resources, second UE 420 may transmit the NACK to respond to unsuccessful decoding of a data packet received in a previous transmission before second UE 420 utilizes the transmission resources to transmit its own data packets.

Figure 6:
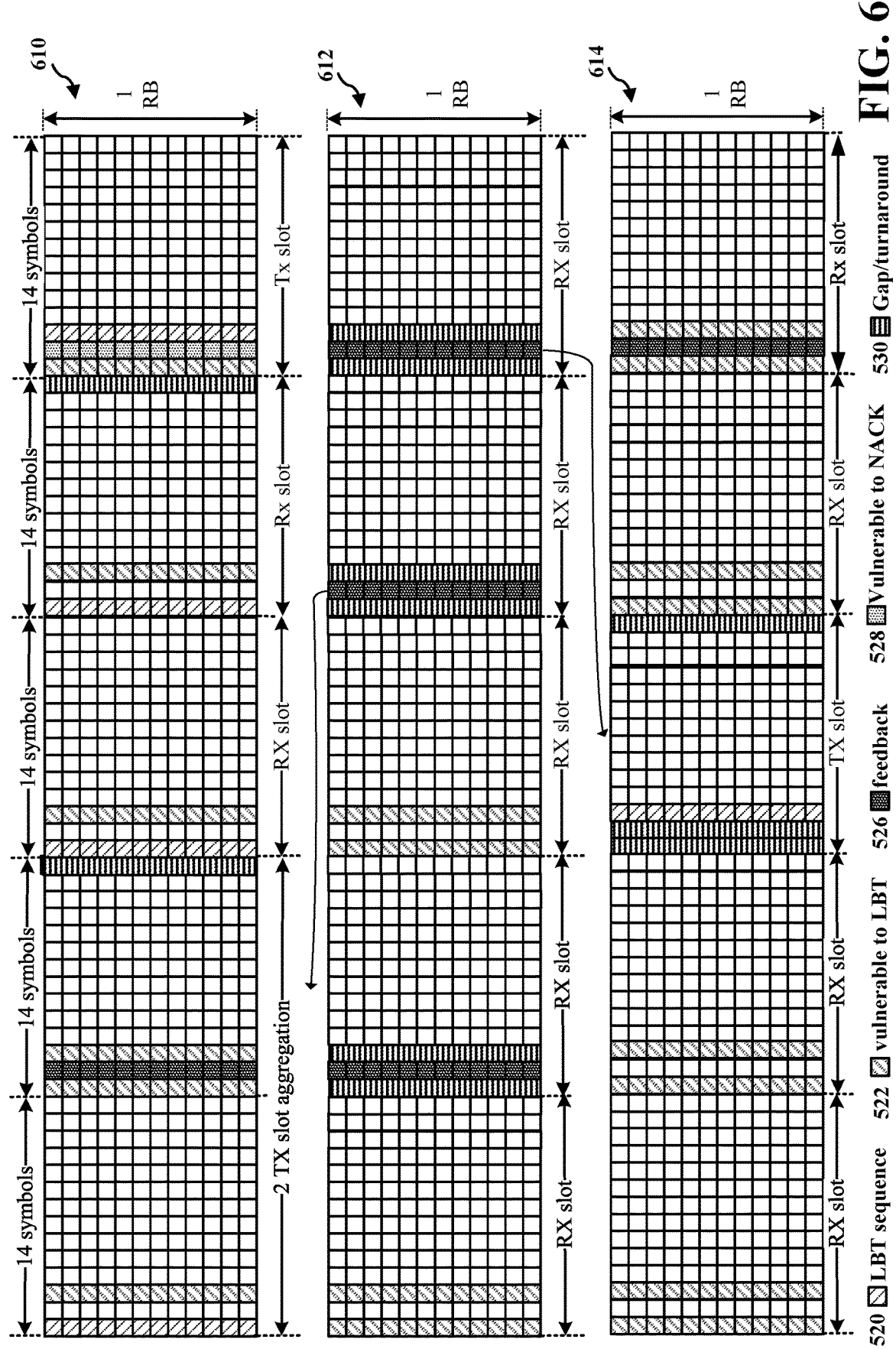
FIG. 6 is a diagram illustrating transmissions of NACKs for HARQ-feedback in the second symbol of a second slot after the end of transmission slots in accordance with certain aspects of the disclosure.

FIG. 6 is a diagram illustrating transmissions of NACKs for HARQ-feedback in the second symbol of a second slot after the end of a transmission (e.g., a first transmit slot following a previous transmission) in accordance with certain aspects of the disclosure. In the five slot transmission resources depicted in timeline 610, a UE may be in a transmitting mode for two slots followed by two slots during which the UE is in the receive mode, which is then followed by one slot during which the UE is again in the transmitting mode. For example, the UE may be first UE 410 of FIGS. 4A-4C. As in FIG. 5, UEs may contend for access to transmission resources by transmitting LBT sequences 520 during symbol 1 and symbol 3 of the slot. As in FIG. 5, the first UE 410 utilizes the transmission resources and may transmit control information, reference signals, and a data packet in an aggregation of two transmitting slots that includes the first and the second slot.

However, unlike FIG. 5, symbol 2 of the second slot following the end of a previous transmission may be reserved as the NACK feedback symbol 526 for use by any UEs for transmitting a NACK in response to the UEs not being able to correctly decode a data packet received in a previous transmission. For example, if second UE 420 could not correctly decode a data packet received from first UE 410 or from other UEs, during an aggregation of one or more transmitting slots that precedes the current two slot aggregation in slots 1 and 2, second UE 420 may transmit a NACK during the NACK feedback symbol 526 in symbol 2 of the second slot of the current two slot aggregation. This may be illustrated by timeline 612 for second UE 420.

In timeline 612, the second UE 420 may receive the transmission from first UE 410 during symbols 2, and 4-14 of the first slot of the two slot aggregation used by first UE 410 for transmitting. At symbol 1 of the second slot, one symbol before the NACK feedback symbol 526, second UE 420 may switch from the receiving mode to the transmitting mode using a gap symbol 530. Because symbol 1 may be used by UEs to transmit LBT sequences for access contention of the transmission resources, first UE 410 might not transmit its data packet using symbol 1. As such, first UE 410 does not puncture its transmission of the data packet during symbol 1.

During the NACK feedback symbol 526, first UE 410 refrains from transmitting. The NACK transmitted from second UE 420 may be received by first UE 410 to indicate that data packet transmitted in a transmission prior to the current two slot aggregation was not correctly decoded by second UE 420 if the prior transmission was from first UE 410. First UE 410 may contend for transmission resources following the current two slot aggregation to retransmit the data packet that was not successfully decoded by second UE 420 in a later transmission. In one aspect, if the transmission prior to the current two slot aggregation was from another UE, and if first UE 410 did not correctly decode the data packet transmitted in the prior transmission, first UE 410 may transmit a NACK using the NACK feedback symbol 526 to request retransmission from the UE transmitting in the prior transmission.

At symbol 3 of the second slot of the two slot aggregation, one symbol after the NACK feedback symbol 526, second UE 420 may switch from the transmitting mode back to the receiving mode using another gap symbol 530. Because symbol 3 may also be used by UEs to transmit LBT sequences for access contention of the transmission resources, first UE 410 might not transmit its data packet using symbol 3. As such, first UE 410 also need not puncture its transmission of the data packet during symbol 3. First UE may continue to transmit the data packet during symbols 4-13 of the second slot of the two slot aggregation. During symbol 14 of the second transmitting slot of the two slot aggregation, first UE 410 may transition from the transmitting mode to a receiving mode by using a gap symbol 530. In one aspect, if LBT sequences are not transmitted in symbol 1 or symbol 3 of the slot, symbol 1 or symbol 3 may be filled after all other symbols in the aggregation of transmitting slots are filled with code rate matched data from a buffer. In one aspect, residual data following code rate matching may be transmitted in symbols 1 and 3 after the remaining symbols (e.g., symbols 4-14) in the slot are filled if LBT sequences are not transmitted in symbols 1 and 3 of the slot.

At slot 3, after first UE 410 has completed transmitting, UEs may contend for access to the transmission resources by transmitting a LBT sequence 520 during symbol 1 and symbol 3. For example, as depicted in timeline 614, third UE 430 may transmit a LBT sequence 520 during the third symbol for LBT counter 1 to contend for access to the transmission resources. If third UE 430 utilizes the transmission resources, third UE 430 may use one or more slots for transmitting. For example, third UE 430 may transmit control information, reference signals, and a data packet using slot 3 in a one slot transmission. Because the NACK feedback symbol 526 is reserved for symbol 2 of a second transmitting slot, and because third UE 430 is transmitting for only one slot, third UE 430 does not reserve any symbol in the one transmitting slot for the NACK feedback symbol 526. As such, third UE 430 may transmit on symbols 4-13 of the one transmitting slot. Third UE 430 may transition from the transmitting mode to a receiving mode by using a gap symbol 530 at symbol 14.

If second UE 420 could not correctly decode the data packet transmitted from first UE 410 during the two slot aggregation used by first UE 410 for transmitting, second UE 420 may transmit a NACK during the NACK feedback symbol 526 of the second slot following the end of the transmission from first UE 410 (e.g., slot 4), as depicted in timeline 614. The NACK transmitted from second UE 420 may be received by first UE 410 to indicate that the data packet transmitted during the two slot aggregation was not correctly decoded by second UE 420. First UE 410 may contend for transmission resources to retransmit the data packet.

During the fifth slot of the transmission resources, UEs may contend for access to the transmission resources by transmitting a LBT sequence 520 during symbol 1 and symbol 3. First UE 410 may utilize the transmission resources for a one slot transmission.

If second UE 420 could not correctly decode the data packet transmitted from third UE 430 during the one slot used by third UE 430 for transmitting, second UE 420 may transmit a NACK during the NACK feedback symbol 526 of the second slot following the end of the transmission from third UE 430, as depicted in timeline 612. This slot is shown as the fifth slot of the transmission resources and is utilized by first UE 410 for the one slot transmission. The NACK transmitted from second UE 420 may be received by third UE 430 to indicate that the data packet transmitted during the one slot transmission was not correctly decoded by second UE 420. Third UE 430 may contend for transmission resources to retransmit the data packet following the current one slot transmission by first UE 410.

In FIG. 6, symbol 2 of the second transmission slot after the end of a previous transmission is reserved for the NACK feedback symbol 526. In one aspect, the symbol number and the number of slots between the end of the previous transmission and the NACK transmission maybe configurable. For example, if additional decoding time is needed by receiving UEs to decode a data packet received in the previous transmission, the NACK feedback symbol 526 may be moved to the third or a subsequent slot after the end of the previous transmission. In one aspect, if a receiving UE has a NACK to transmit, the receiving UE may not contend for the transmission resources until the receiving UE transmits the NACK. For example, if second UE 420 has data packets to transmit and wishes to acquire the transmission resources, second UE420 may transmit the NACK to respond to unsuccessful decoding of a data packet received in a previous transmission before second UE 420 acquires the transmission resources to transmit its own data packets.

Figure 7:
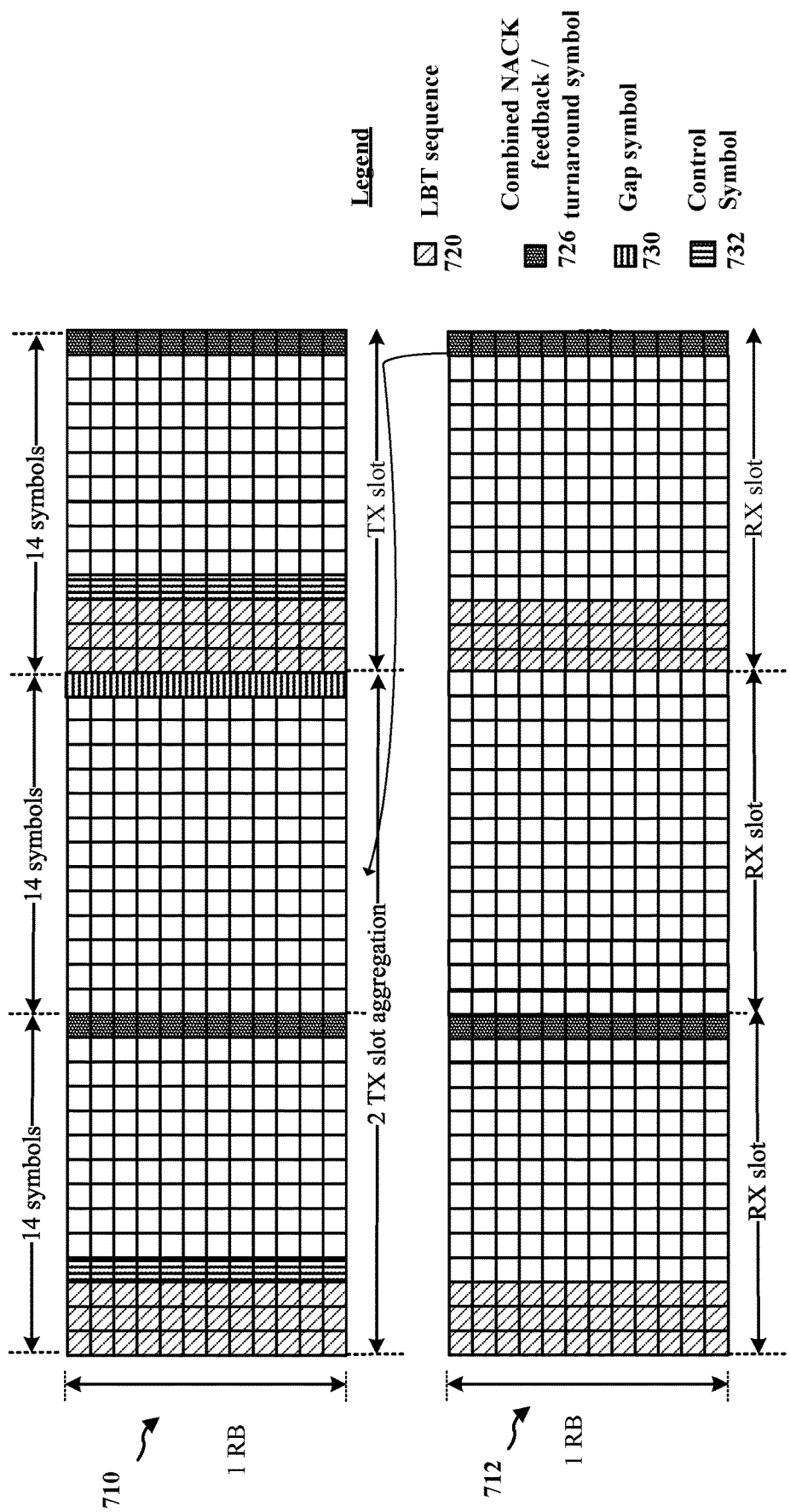
FIG. 7 is a diagram illustrating transmissions of NACKs for HARQ-feedback and turnaround time within one symbol in accordance with certain aspects of the disclosure.

FIG. 7 is a diagram illustrating transmissions of NACKs for HARQ-feedback and the use of a turnaround time in accordance with certain aspects of the disclosure. In FIG. 7, the turnaround time for a receiving UE to switch from a receiving mode to a transmitting mode to transmit a NACK, the transmitting of the NACK, and the turnaround time for the receiving UE to switch from the transmitting mode back to the receiving mode are all combined into one symbol.

In the three slot transmission resources depicted in timeline 710, a UE may be in a transmitting mode for two slots followed by one slot during which the UE is in another transmitting mode. A gap symbol 730 may be provided between the two slot aggregation and the following transmission slot. For example, the UE may be first UE 410 of FIGS. 4A-4C. First UE 410 may contend for access to transmission resources by transmitting LBT sequences 720 during symbols 1, 2, and 3 of the slot. First UE 410 may utilize the transmission resources and may transmit control information in a control symbol 732 in symbol 4, and may transmit reference signals and a data packet in symbols 5-13 of a first slot and in symbols 1-13 of a second slot of an aggregation of two transmitting slots.

Symbols 14 of the first slot following the end of a previous transmission may be reserved as the NACK feedback symbol 726 for use by any UEs for transmitting a NACK in response to the UEs not being able to correctly decode a data packet received in a previous transmission. For example, if second UE 420 could not correctly decode a data packet received from another UE during an aggregation of one or more transmitting slots that precedes the current two slot aggregation, second UE 420 may transmit a NACK during the NACK feedback symbol 726 in symbol 14 of the first slot of the current two slot aggregation. This may be illustrated by timeline 712 for second UE 420. However, unlike in FIG. 5 and FIG. 6, second UE 420 may use a first part of symbol 14 to switch from the receiving mode to the transmitting mode, transmit the NACK during a second part of symbol 14, and use a third part of symbol 14 to switch from the transmitting mode back to the receiving mode. For example, second UE 420 may switch from the receiving mode to the transmitting mode during the first quarter of the symbol time of symbol 14. UE 420 may transmit the NACK signal during the second and third quarters of the symbols time of symbol 14. UE 420 may then switch from the transmitting mode back to the receiving mode during the last quarter of the symbol time of symbol 14.

By transmitting the NACK in half of the symbol time of symbol 14, the subcarrier spacing of symbols is doubled and the number of subcarriers available for NACK transmission is consequently reduced by a half. As a result, instead of having 12 subcarriers in a resource block of a symbol available for use for transmission, the number of available subcarriers is reduced to 6. However, by transmitting in only a portion of the symbol time of the NACK feedback symbol, second UE 420 may turnaround from receiving to transmitting, transmit the NACK, and turnaround from transmitting back to receiving all within one symbol when transmitting the NACK. In one aspect, up to two bits for a NACK may be transmitted in two subcarriers.

FIG. 8 is a diagram illustrating transmissions of NACKs for HARQ-feedback in dedicated NACK symbols after every N slots in accordance with certain aspects of the disclosure. In FIG. 8, NACKs for data packets or transport blocks in multiple slots may be multiplexed and transmitted in the same NACK feedback symbol. The NACK feedback symbol may be a dedicated system wide symbol used by any receiving UEs to transmit NACKs for data packets that were unsuccessfully decode in the previous N slots. For example, a set of symbols may be dedicated for switching modes and transmitting NACKs. FIG. 8 illustrates a set of three symbols. This is merely an example, and the set of symbols may include a different number of symbols. The three symbols may include a first turnaround symbol 830 to allow a receiving UE to switch from the receiving mode to the transmitting mode, a NACK feedback symbol 826 for transmitting the NACK signals, and a second turnaround symbol 830 to switch from the transmitting mode back to the receiving mode. In one aspect, N is configurable.

Figure 9A:
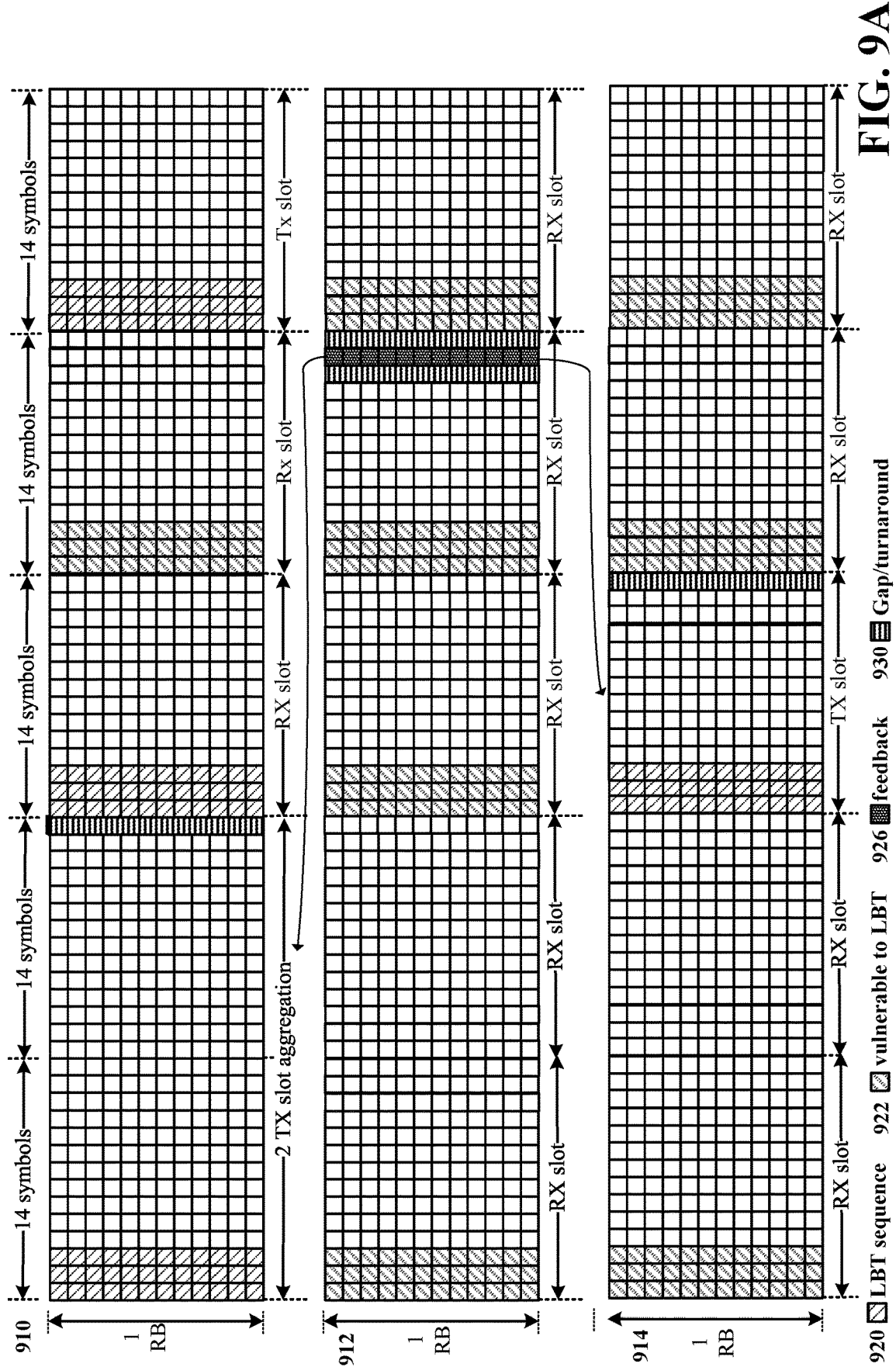
FIG. 9A and FIG. 9B are diagrams illustrating transmissions of NACKs for HARQ-feedback in dedicated NACK symbols after every 3 slots in accordance with certain aspects of the disclosure.

FIG. 9A is a first diagram illustrating transmissions of NACKs for HARQ-feedback in dedicated NACK symbols after every N slots in accordance with certain aspects of the disclosure. In the five slot transmission resources depicted in timeline 910, a UE may be in a transmitting mode for two slots followed by two slots during which the UE is in the receive mode, which is then followed by one slot during which the UE is again in the transmitting mode. For example, the UE may be first UE 410 of FIGS. 4A-4C. UEs may contend for access to transmission resources by transmitting LBT sequences 920 during the first three symbols of the slot. Therefore, some symbols 922 of a particular UE may be vulnerable to LBT sequences transmitted by other contending UEs. First UE 410 may utilize the transmission resources and may transmit control information, reference signals, and a data packet in an aggregation of two transmitting slots that includes the first and the second slot.

Because dedicated NACK symbols are used to transmit NACKs, first UE 410 may transmit from symbol 4 of the first slot until symbol 13 of the second slot of the two slot aggregation. During slot 3, after first UE 410 has completed transmitting, UEs may contend for access to the transmission resources by transmitting a LBT sequence 920 during the first three symbols of the slot. For example, as depicted in timeline 914, third UE 430 may transmit a LBT sequence 920 during the first three symbols to contend for access to the transmission resources. Third UE 430 may use one or more slots of the transmission resources for transmitting. For example, third UE 430 may transmit control information, reference signals, and a data packet using the third slot of the transmission resources in a one slot transmission. Again, because dedicated NACK symbols are used to transmit NACKs, third UE 430 may transmit from symbol 4 until symbol 13 of the third slot.

After the three slots of transmission, three symbols are dedicated for NACK transmission. For example, a first turnaround symbol 930 may be used to allow a receiving UE to switch from the receiving mode to the transmitting mode, a NACK feedback symbol 926 may be used for transmitting the NACK signals, and a second turnaround symbol 930 may be used to switch from the transmitting mode back to the receiving mode. If second UE 420 could not correctly decode the data packet transmitted from first UE 410 during the two slot aggregation used by first UE 410 for transmitting, or if second UE 420 could not correctly decode the data packet transmitted from third UE 430 during its one slot transmission, second UE 420 may transmit NACK signals using the three dedicated symbols for NACK transmission as depicted in timeline 912. In FIG. 9A, the three dedicated symbols are shown as part of a slot (e.g., in symbols 12-14 of a slot). In one aspect, the three dedicated symbols may be standalone symbols that are not part of any slot.

In FIG. 9A, the dedicated NACK symbols in slot 4 are used by UEs to send NACKs in response to data packets received by the UEs in slots 1-3. Because the dedicated NACK symbols are part of a regular slot structure, data packets may be transmitted during the remaining symbols (e.g., symbols 1-11) of the slot containing the dedicated NACK symbols (e.g., slot 4). NACKs for data packets transmitted during these symbols may be transmitted during the next dedicated NACK symbols. As such, the dedicated NACK symbols in slot 4 may also be used to send NACKs in response to data packets received in the slot that contains the previous dedicated NACK symbols, e.g., a slot preceding slot 1. In one aspect, if the dedicated NACK symbols occur every N slots, the dedicated NACK symbols may be used to transmit NACKs for data packets received during the window of slots from slots 1 to slot N−1, the following dedicated NACK symbols may be used to transmit NACK from slot N to slot 2N−1, and so forth. For example, in FIG. 9A, the dedicated NACK symbols in slot 4 may be used to transmit NACKs for data packets received during the window of slots 0, 1, 2, 3 if the number of slots between dedicated NACK symbols, N, is 4. In one aspect, for dedicated symbols at slot M, the dedicated NACK symbols may be used to transmit NACKS for data packets received during the window of slots (M-N-1) . . . (M—2) if data packet decoding latency of the receiving device is large. M, N, and the offset by which the window of slots containing the data packets are offset from M may be configurable.

Figure 9B:
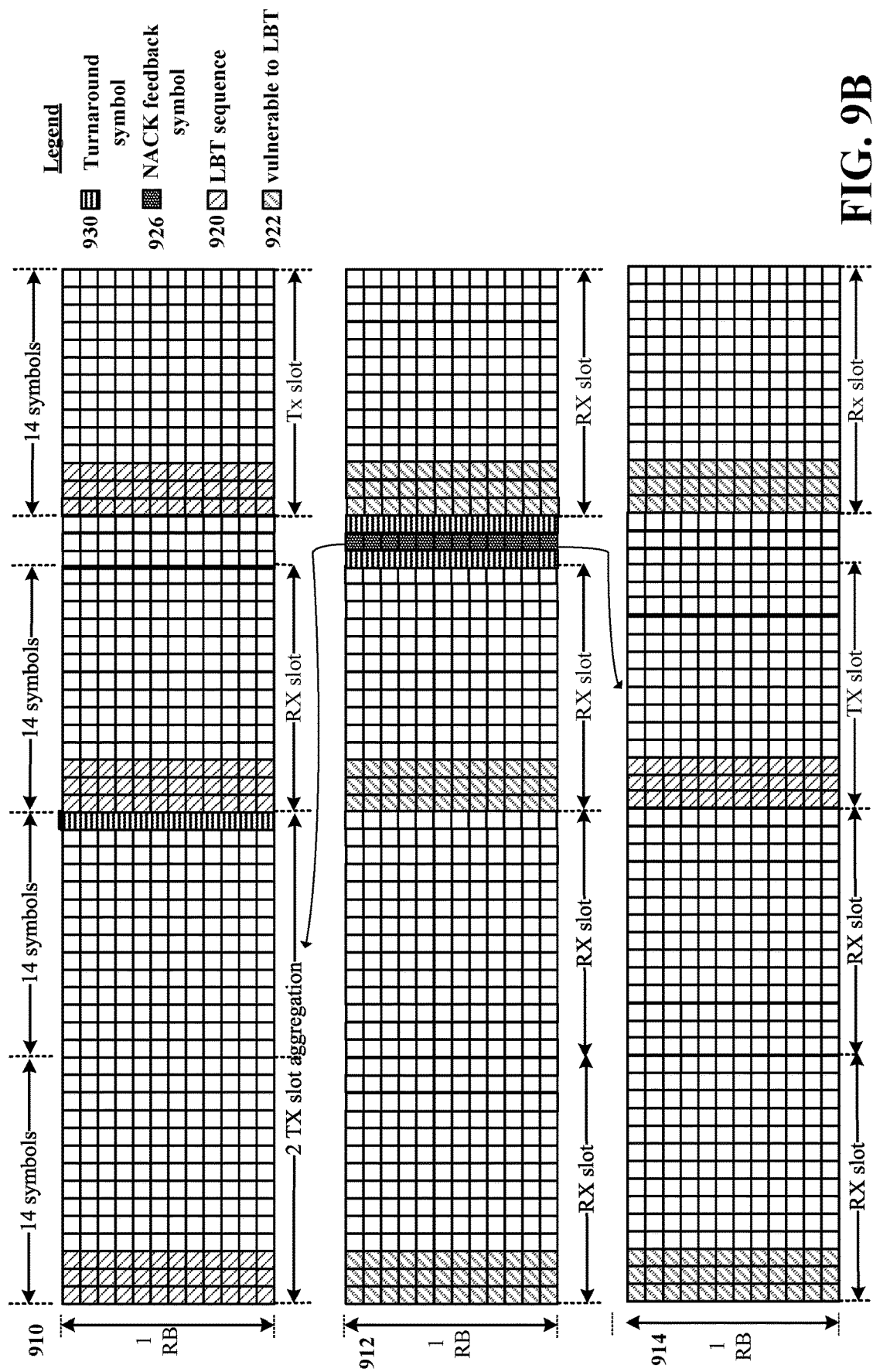

FIG. 9B is a first diagram illustrating example transmissions of NACKs for HARQ-feedback in dedicated NACK symbols, e.g., after every 3 slots in accordance with certain aspects of the disclosure. In FIG. 9B, the three dedicated NACK symbols are standalone symbols that are not part of a slot. For example, the two turnaround symbols 930 and the NACK feedback symbol 926 are not part of a regular slot. The three dedicated NACK symbols may be used by UEs to respond to data packets received by the UEs in the first three slots. The number of slots between the dedicated NACK symbols, N, and the offset by which the window of slots containing the data packets is offset from the dedicated NACK symbols may be configurable.

FIG. 10 illustrates aspects of feedback channels containing NACKs for multicast and unicast transmissions in accordance with certain aspects of the disclosure. In one aspect, reference signals for the NACK signals may be transmitted in a comb-4 pattern, or in one of every four subcarriers of a NACK feedback symbol, as shown in table 1010. Reference signals may be used by the UE receiving the NACK signals for estimating the channels. The NACKS signal may be carried on the other subcarriers. In one aspect, for multicast transmission, only one bit representing the NACK may be required. The NACK may use repetition coding using the same LBT sequence that was used to represent the of the transmission resources. In some examples, the NACK may include one or more additional feedback bits transmitted in the NACK feedback symbol. For unicast transmissions, additional feedback signals may be transmitted. In one aspect, assuming a granularity of 10 RB, the feedback channel may contain 18 bits of information. The modulation coding scheme used for the feedback channel may be QPSK ½ with a coding rate of $1/10^{th}$. In one aspect polar coding may be used, similar to that used for the control information. Table 1020 shows that in unicast transmissions, up to 12 bits may be transmitted. The number of feedback bits depends on the type of feedback. For example, only three bits may be required if feedback of only RI and NACK is desired. In another example, 8 bits may be required if feedback of RI, CQI, and NACK is desired.

Figure 11:
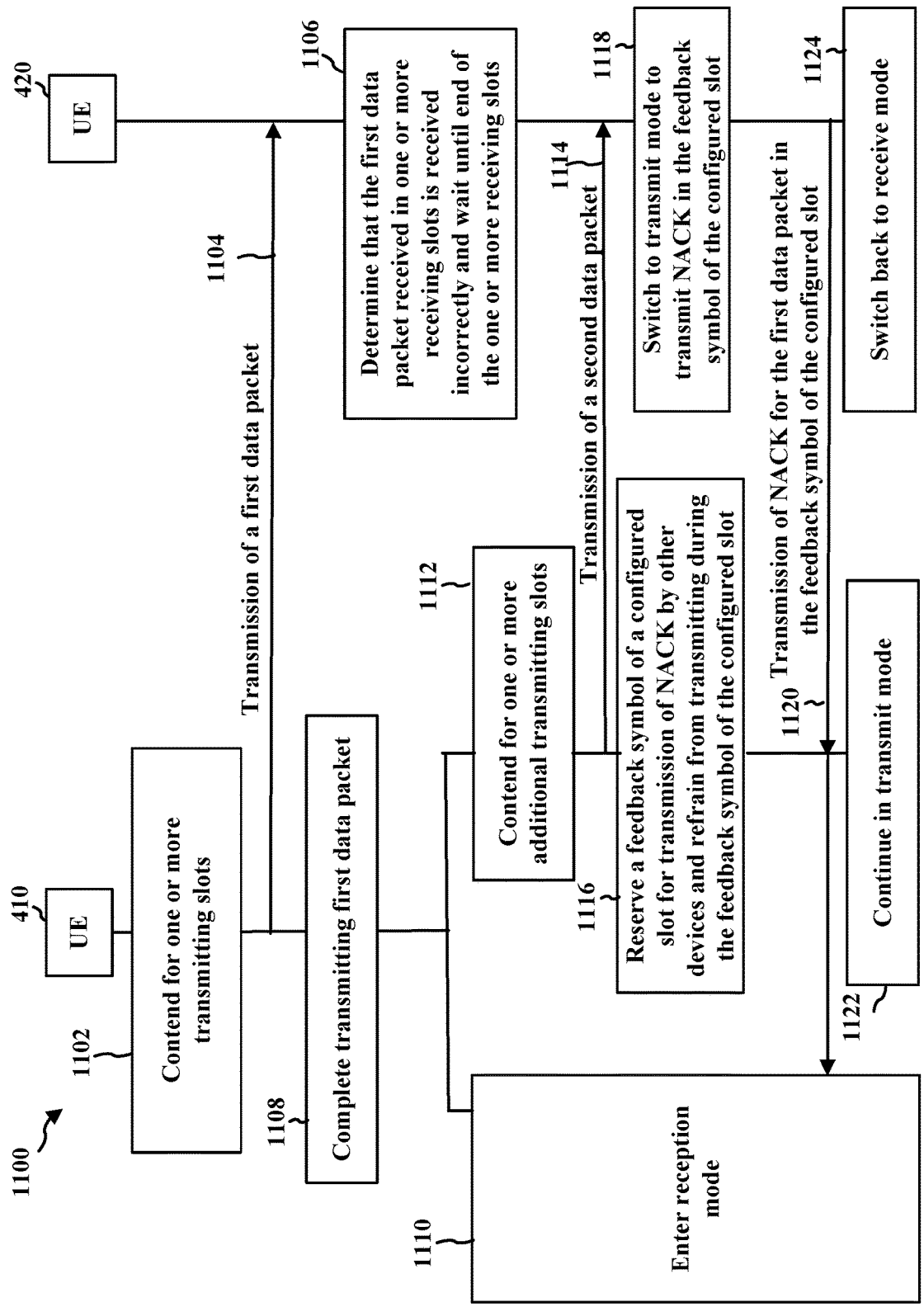
FIG. 11 is a call flow diagram illustrating an implementation of data packet transmissions from a transmitting UE and NACKs for HARQ-feedback from a receiving UE in accordance with certain aspects of the disclosure.

FIG. 11 is a call flow diagram 1100 illustrating an implementation of data packet transmissions from a transmitting UE and NACKs for HARQ-feedback from a receiving UE in accordance with certain aspects of the disclosure. The communication between UEs may be based on any of V2V, V2X, and/or other D2D communication. While these aspects are illustrated using the example of a first UE 410 and a second UE 420, the aspects are equally applicable to other types of UEs and other transmitting and receiving devices engaged in V2V, V2X, and/or other D2D communication. The UE transmitting the data packet may be first UE 410 of FIGS. 4A-4C. The UE transmitting the NACK may be the second UE 420 of FIG. 4.

At 1102, first UE 410 has a data packet to transmit and may contend for access to transmission resources. For example, first UE 410 may transmit a LBT sequence during the first symbol of a slot. Other UEs may contend for the transmission resources by transmitting their LBT sequences. Then, first UE 410 may utilize the transmission resources, e.g., a slot or an aggregation of slots, for transmitting control and a first data packet 1104. At 1108, first UE 410 may complete transmitting the first data packet 1104.

At 1106, second UE 420 may receive the first data packet 1104 transmitted by first UE 410 during the one or more slots. Second UE 420 may determine if the first data packet 1104 is correctly received by performing a CRC on the received data. If the CRS fails, second UE 420 may determine the first data packet 1104 to have been received incorrectly. Second UE 420 may wait until the end of the one or more slots. In one aspect, second UE 420 may require additional time to perform the CRC and second UE 420 may not be able to determine that the first data packet 1104 was received incorrectly until some delay after the end of the one or more slots during which the first data packet 1104 was transmitted.

After first UE 410 completes transmitting the first data packet during the one or more slots, first UE 410 may enter into a reception mode in 1110 if it does not have any additional data packets to transmit. During the reception mode 1110, first UE 410 may listen to transmissions from other UEs, including listening for any NACK transmitted by second UE 420 or any other UEs. Alternatively, first UE 410 may have additional data packets to transmit and may again contend for transmission resources by transmitting LBT sequences during the first slot of a slot in 1112. After performing the LBT sequence, UE 410 may use one slot or an aggregation of slots for transmitting control and a second data packet 1114.

At 1116, first UE 410 may reserve a feedback symbol of a configured slot for use by UEs for transmitting NACK feedback when unable to correctly decode the first data packet 1104 received in the previous transmission from first UE 410. First UE 410 may refrain from transmitting during the feedback symbol of the configured slot. In one aspect, the configured slot may be configured to be N slots after the end of the previous transmission.

Second UE 420 may receive the second data packet 1114 and may determine if the second data packet 1114 is received correctly. If second UE 420 has a NACK signal to transmit because the first data packet 1104 was not received correctly, second UE 420 may switch from the receiving mode to the transmitting mode prior to the feedback symbol of the configured slot. In one aspect, second UE 420 may switch from the receiving mode to the transmitting mode in the symbol prior to the feedback symbol of the configured slot at 1118. In one aspect, second UE 420 may switch from the receiving mode to the transmitting mode in the same symbol as the feedback symbol of the configured slot but before the start of transmission of the NACK. Second UE may transmit the NACK for the data packet in the feedback symbol of the configured slot at 1120.

At 1124, second UE 420 may switch from the transmitting mode back to the receiving mode after transmitting the NACK. In one aspect, second UE 420 may switch from the transmitting mode back to the receive mode in the symbol after the feedback symbol of the configured slot at 1124. In one aspect, second UE 420 may puncture the portion of the second data packet 1114 received from first UE 410 during the symbol after the feedback symbol of the configured slot. In one aspect, second UE 420 may switch from the transmitting mode back to the receiving mode in the same symbol as the feedback symbol of the configured slot but after the end of transmission of the NACK.

First UE 410 may listen to any NACK transmitted by second UE 420 or any other UEs during the feedback symbol of the configured slot if first UE 410 also transmitted in the previous transmission. For example, the NACK transmitted by second UE 420 may indicate to first UE 410 to retransmit the first data packet 1104 that was transmitted in the previous transmission because second UE 420 was not able to receive the first data packet 1104 correctly. If first UE 410 did not transmit in the previous transmission, first UE 410 may ignore any NACKs received during the feedback symbol of the configured slot.

At 1122, after the feedback symbol of the configured slot, first UE 410 may resume transmitting the second data packet 1114 during the one or more transmitting slots. In one aspect, to accommodate NACK transmitting UEs without compromising the data rate of other UEs that do not transmit NACKs in the feedback symbol of a configured slot, first UE 410 may fill the symbols prior and after the feedback symbols in every slot after all other symbols in the aggregation of transmitting slots are filled with code rate matched data from a buffer.

Figure 12:
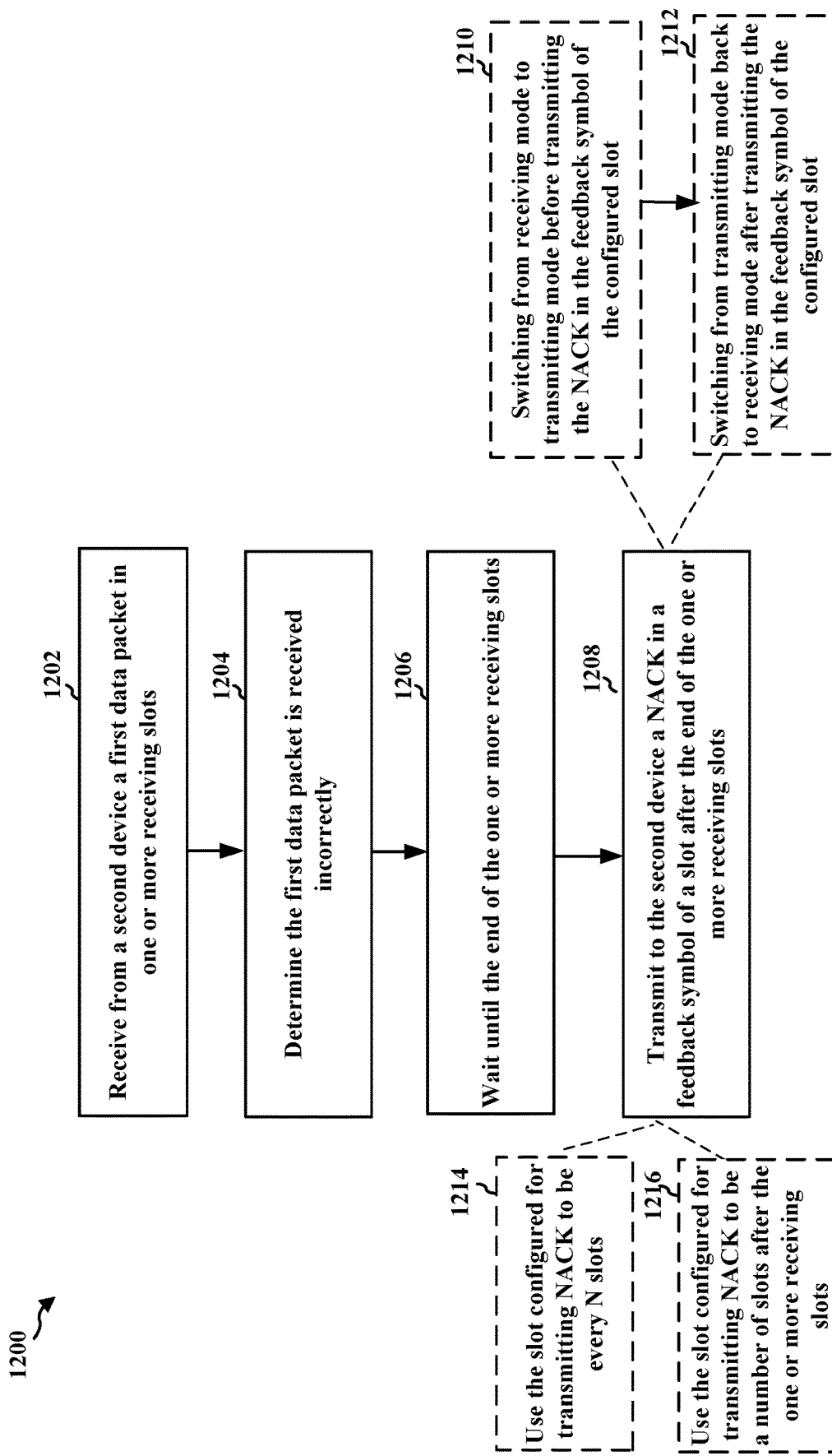
FIG. 12 is a flowchart of a method for receiving data packets from a transmitting UE and transmitting NACK feedbacks that may be implemented by a receiving UE in accordance with certain aspects of the disclosure.

FIG. 12 is a flowchart of a method 1200 of wireless communication that involves receiving data packets from a transmitting UE and transmitting feedback that may be implemented by a receiving UE in accordance with certain aspects of the disclosure. The method may be performed by a device engaged in V2V/V2X/D2D communication, e.g., UE or a component of a UE 104, 410, 420, 430; the device 350; the apparatus 1300, 1300'; the processing system 1414, which may include memory 1406 and one or more of RX processor 356, 370, TX processor 316, 368, or controller/processor 359, 375. Additional devices engaged in V2V/V2X communication may also perform the method, e.g., an RSU, base station, etc. The method may provide more reliable communication, by enabling communication devices engaged in TDD communication to more effectively provide NACK feedback. In V2V/V2X/D2D communication, receiving devices may transmit only NACK feedback. In other words, transmitting devices may assume that the transmitted data packets are successfully received by receiving devices unless NACK feedback is received.

The method allows a receiving device that does not receive the data packets correctly from a transmitting device to transmit a NACK to the transmitting device during a portion of a receiving slot in which the receiving device may receive additional data packets from other transmissions. The receiving device may switch from a receiving mode to a transmitting mode, transmit the NACK, and switch from the transmitting mode back to the receiving mode to continue receiving data packets. The method provides a way for the receiving device to transmit the NACK without compromising the detection performance of other transmissions.

At 1202, a first device may receive from a second device a first data packet in one or more receiving slots. The reception may be performed, e.g., by the reception component 1312 of the apparatus 1300. The slots may be part of a TDD frame that includes a plurality of slots, such as in the example frame structures illustrated in any of FIGS. 5-9. A plurality of devices may contend for use of the plurality of slots for transmission, e.g., using a LBT mechanism. Each slot may include a plurality of symbols.

At 1204, the first device may determine whether the first data packet is received incorrectly. The determination may be performed, e.g., by the error determination component 1302 of the apparatus 1300. In some aspects, the first device may perform a CRC check on the first data packet. If the CRC fails, the first device may determine that the first data packet is received incorrectly and may transmit a NACK to solicit retransmission of the first data packet.

At 1206, the first device may wait until the end of the one or more receiving slots, such as a receiving device waiting until the end of the 2 slot aggregation illustrated in FIG. 5. The waiting may be performed by the receiving slot component 1304 of the apparatus 1300. In one aspect, first device may require additional time to perform the CRC check, and the first device may not be able to determine that the first data packet was received incorrectly until some delay after the end of the one or more receiving slots. Thus, the first device may wait until the end of more than one receiving slot to send the feedback.

At 1208, the first device may transmit to the second device a NACK in a feedback symbol of a slot after the end of the one or more receiving slots in response to determining that the first packet is received incorrectly. The slot may comprise a configured slot. The transmission may be performed, e.g., by the NACK feedback control component 1308 and/or the transmission component 1310 of the apparatus 1300. The feedback symbol of the slot may be reserved for use any UEs for transmitting a NACK in response to the UEs unable to correctly decode the first data packet from the second device received during the one or more receiving slots. In one aspect, the slot may be configured to be N slots after the end of the one or more receiving slots.

At 1210, the first device may switch from the receiving mode to the transmitting mode during a first turnaround symbol in the slot in order to transmit the first NACK in the NACK feedback symbol. The first turnaround symbol may come one symbol before the feedback symbol. The switch may be performed, e.g., by the NACK feedback control component 1308 of the apparatus 1300. For example, the first device may switch from receiving a second packet in the slot from a third device during the receiving mode. In one aspect, first device may switch from the receiving mode to the transmitting mode in the same symbol as the feedback symbol of the slot but before the start of transmission of the NACK. Thus, in this aspect, the first device may transmit the first NACK to the second device in a transmitting portion of the NACK feedback symbol of the slot. The NACK feedback symbol may include a larger sub-carrier spacing than a sub-carrier spacing of other symbols in the one or more receiving slots, and the transmitting portion of the NACK feedback symbol may be less than a symbol length of the NACK feedback symbol. In some aspects, the slot may comprise a first slot that follows the one or more receiving slots, and the NACK feedback symbol may include a symbol thirteen of the slot. The first turnaround symbol may include symbol twelve of the slot, and the second turnaround symbol may include symbol fourteen of the slot. FIG. 5 illustrates an example of include a NACK feedback symbol at symbol thirteen of the slot. The slot may include a second slot that is separated from the one or more receiving slots by at least one slot, and the NACK feedback symbol may include a second symbol of the slot. The first turnaround symbol may include a first symbol of the slot, and the second turnaround symbol may include a third symbol of the slot. FIG. 6 illustrates an example in which the NACK feedback symbol includes a second symbol of the slot. The slot may be at a configurable number of slots after the one or more receiving slots.

At 1212, the first device may switch from the transmitting mode back to the receiving mode during a second turnaround symbol in the slot. The second turnaround symbol may come one symbol after the NACK feedback symbol. The switch may be performed, e.g., by the NACK feedback control component 1308 of the apparatus 1300. In one aspect, first device may switch from the transmitting mode back to the receiving mode in the same symbol as the feedback symbol of the slot but after the end of transmission of the NACK. The first device may further switch to the transmitting mode to transmit a third packet in a subsequent slot following the slot after transmitting the first NACK in the NACK feedback symbol in the slot.

The first device may use a set of dedicated symbols that are reserved for NACK, e.g., in a system wide manner, such as described in connection with FIG. 8. Occurrences of the set of dedicated symbols for NACK may occur every N slots. Thus at 1214, the first device may transmit the NACK using a NACK feedback symbol that comprises a symbol every N slots of the TDD frame. In one aspect, dedicated NACK symbols after every N slots may be used for transmitting NACKs for data packets that were unsuccessfully decode in the previous N slots. The NACKs for the data packet transmitted in the N slots may be multiplexed and transmitted in the dedicated NACK symbol. N may be a configurable parameter. For example, a set of symbols, such as three symbols, may be dedicated for NACK, as described in connection with FIG. 8. The three symbols may include a first turnaround symbol to allow a receiving UE to switch from the receiving mode to the transmitting mode, a NACK feedback symbol for transmitting the NACK signals, and a second turnaround symbol to switch from the transmitting mode back to the receiving mode.

At 1216, the first device may transmit the NACKS a number of slots after the end of the one or more receiving slots. The transmission may be performed, e.g., by the transmission component 1310 of the apparatus 1300. The slot may be configurable to allow sufficient time for the first device to determine if any data packet is received in error during the one or more receiving slots. In one aspect, the slot may be the first slot after the end of the one or more receiving slots and the feedback symbol may be symbol 13. In one aspect, the slot may be the second slot after the end of the one or more receiving slots and the feedback symbol may be symbol 2.

The first device may receive one or more additional data packets from a third device in the one or more receiving slots. The first device may similarly determine whether the one or more additional data packets are received correctly. The first device may transmit to the third device an additional NACK with the first NACK in the NACK feedback symbol in the slot in response to determining that the one or more additional data packets are received incorrectly. A number of the one or more receiving slots may be configurable for receiving the first data packet and the one or more additional data packets.

The NACK that is transmitted at 1208 may include one or more additional feedback bits transmitted in the NACK feedback symbol. The one or more additional feedback bits may be transmitted by the first device in a unicast transmission. The one or more additional feedback bits may include a reference signal that is transmitted by the first device on one of every N subcarriers of the NACK feedback symbol.

Figure 18:
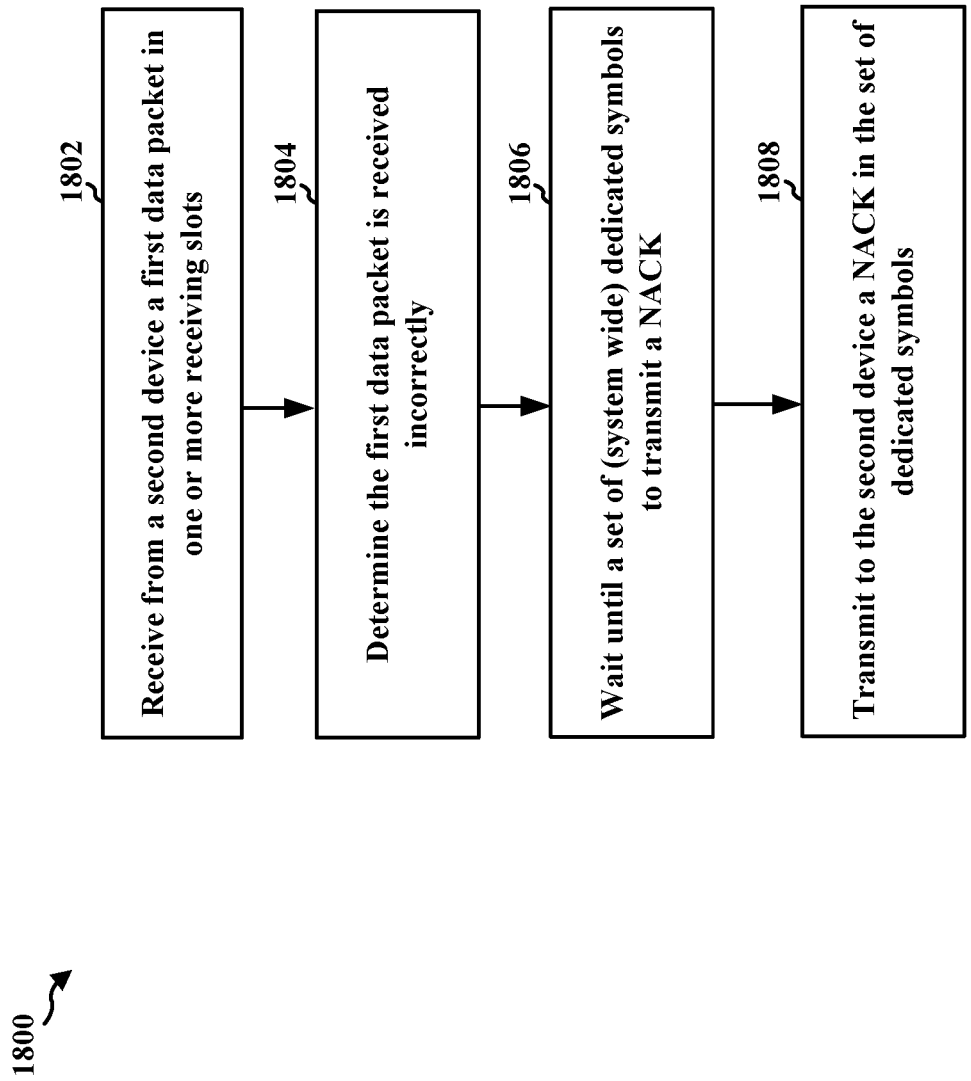
FIG. 18 is a flowchart of a method of wireless communication that involves receiving data packets from a transmitting UE and transmitting feedback that may be implemented by a receiving UE in accordance with certain aspects of the disclosure.

FIG. 18 is a flowchart of a method 1800 of wireless communication that involves receiving data packets from a transmitting UE and transmitting feedback that may be implemented by a receiving UE in accordance with certain aspects of the disclosure The method may be performed by a device engaged in V2V/V2X/D2D communication, e.g., UE or a component of a UE 104, 410, 420, 430; the device 350; the apparatus 1300, 1300'; the processing system 1414, which may include memory 1406 and one or more of RX processor 356, 370, TX processor 316, 368, or controller/processor 359, 375. Additional devices engaged in V2V/V2X communication may also perform the method, e.g., an RSU, base station, etc. In FIG. 18, the receiving device may use a dedicated set of at least one symbol to transmit the NACK. The dedicated set of symbols may comprise a system wide dedicated symbol, e.g., as described in connection with FIG. 8.

At 1802, the receiving device receives from a second device a first data packet in one or more receiving slots of a TDD frame that includes a plurality of slots, wherein a slot includes a plurality of symbols, e.g., such as described in connection with 1202 in FIG. 12. The reception may be performed, e.g., by the reception component 1312 of the apparatus 1300.

At 1804, the receiving device determines whether the first data packet is received incorrectly. For example, the determination may include aspects described in connection with 1204 in FIG. 12. The determination may be performed, e.g., by the error determination component 1302 of the apparatus 1300.

At 1806, the receiving device may wait until a set of dedicated symbols to transmit a first NACK. The wait may be performed, e.g., by the NACK feedback control component 1308 of the apparatus 1300. The set of dedicated symbols may be reserved by a communication system, e.g., in a system wide manner, for feedback. The set of dedicated symbols may comprise occurrences spaced by a number of N slots, e.g., as described in connection with FIG. 8. Each occurrence of the set of dedicated symbols comprises at least three symbols, e.g., a NACK/feedback symbol, and at least one surrounding symbol before and after the NACK/feedback symbol. FIG. 9A illustrates an example in which the set of dedicated symbols may be symbols within one of the N slots. For a spacing of N slots, the dedicated resources may be used for NACK for the slots from slot 1 to slot N−1. FIG. 9B illustrates an example in which the set of dedicated symbols are provided separate from a slot. The set of dedicated symbols may include symbols within one of the plurality of slots. The set of dedicated symbols may include standalone symbols outside of the plurality of slots. The one or more receiving slots containing the first data packet for which the NACK is transmitted may be offset from the set of dedicated symbols by one or more offset slots. The one or more offset slots may be configurable.

At 1808, the receiving device may transmit to the second device the first NACK in a NACK feedback symbol in the set of dedicated symbols after the end of the one or more receiving slots in response to determining that the first data packet is received incorrectly. The transmission may be performed, e.g., by the transmission component 1310 of the apparatus 1300.

Figure 13:
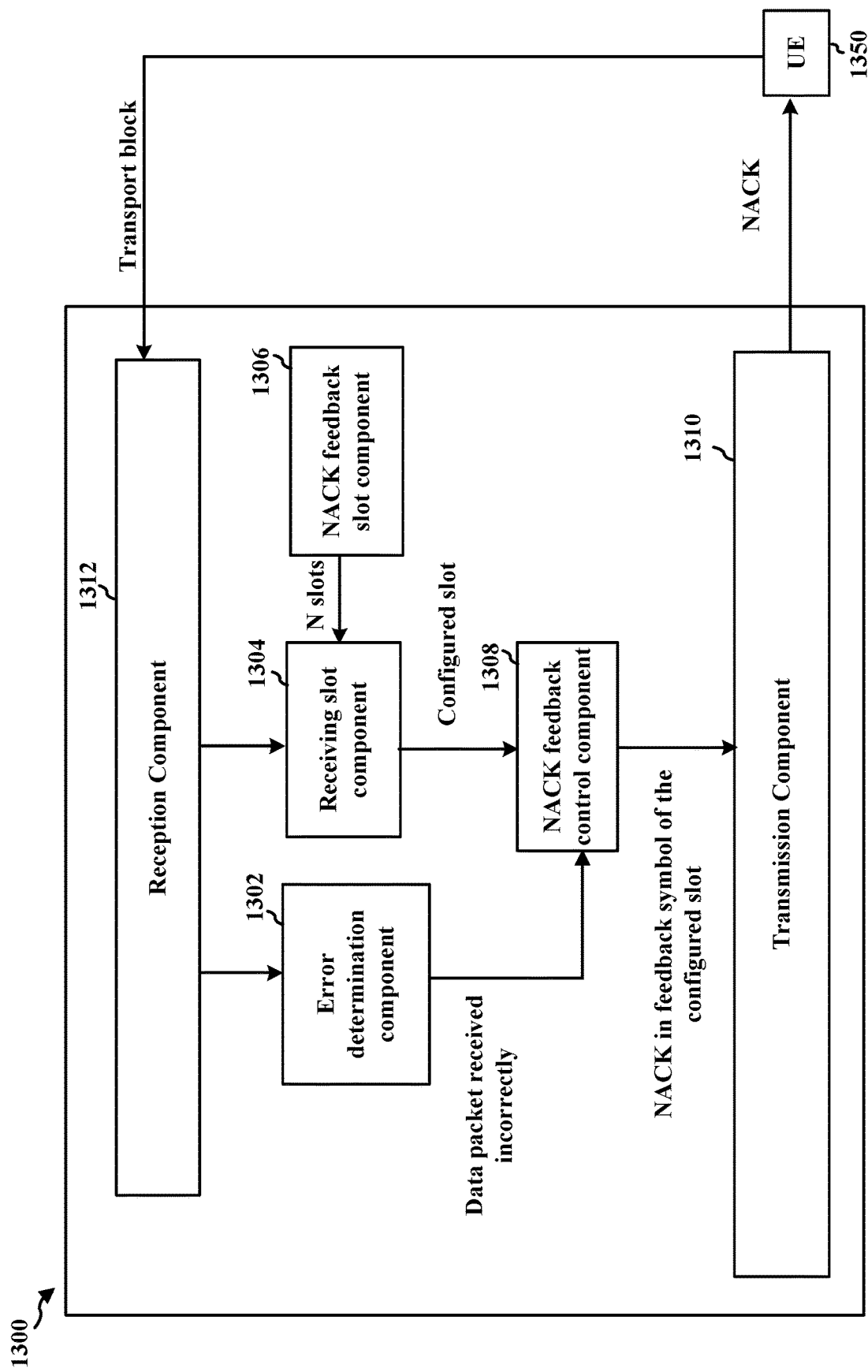
FIG. 13 is a conceptual data flow diagram illustrating the data flow between different modules/means/components in an example apparatus of a receiving UE in accordance with certain aspects of the disclosure.

FIG. 13 is a conceptual data flow diagram illustrating the data flow between different modules/means/components in an example apparatus 1300 of a receiving device in accordance with certain aspects of the disclosure. The apparatus 1300 may comprise a UE or a component of a UE or another receiving device engaged in V2V, V2X, or other D2D communication. The apparatus 1300 may include a transmission component 1310, an error determination component 1302, a receiving slot component 1304, a NACK feedback slot component 1306, a NACK feedback control component 1308, and a reception component 1312.

The error determination component 1302 may be configured to determine if a first data packet is received incorrectly, e.g., as described in connection with 1204 in FIG. 12 or 1804 in FIG. 18. The receiving slot component 1304 may be configured to determine if the end of the one or more receiving slots during which the first data packet is received has been reached, e.g., as described in connection with 1206 in FIG. 12. In one aspect, the receiving slot component 1304 may be configured to determine that the error determination component 1302 has not completed determining that the first data packet is receive incorrectly until some delay after the end of the one or more receiving slots. The NACK feedback slot component 1306 may be configured to determine or select the slot for transmitting the NACKS to be a number of slots after the end of the one or more receiving slots. The determined slot may be selected to allow sufficient time for the first device to determine if any data packet is received in error during the one or more receiving slots. In one aspect, the determined slot may be the first slot after the end of the one or more receiving slots and the feedback symbol may be symbol 13. In one aspect, the determined slot may be the second slot after the end of the one or more receiving slots and the feedback symbol may be symbol 2. In one aspect, the NACK feedback slot component 1306 may be configured to determine the slot for transmitting the NACK to be every N slots. In one aspect, dedicated NACK symbols after every N slots may be used for transmitting NACKs for data packets that were unsuccessfully decode in the previous N slots. The NACKs for the data packet transmitted in the N slots may be multiplexed and transmitted in the dedicated NACK symbol. For example, three symbols may be dedicated for NACK. The three symbols may include a first turnaround symbol to allow a receiving UE to switch from the receiving mode to the transmitting mode, a NACK feedback symbol for transmitting the NACK signals, and a second turnaround symbol to switch from the transmitting mode back to the receiving mode. In one aspect, N is configurable.

The NACK feedback control component 1308 may be configured to transmit a NACK in a feedback symbol of the configured slot. In one aspect, the NACK feedback control component 1308 may be configured to switch the apparatus 1300 from the receiving mode to the transmitting mode in the symbol prior to the feedback symbol of the configured slot. In one aspect, the apparatus 1300 may switch from the receiving mode to the transmitting mode in the same symbol as the feedback symbol of the configured slot but before the start of transmission of the NACK. In one aspect, the NACK feedback control component 1308 may be configured to switch the apparatus 1300 from the transmitting mode back to the receive mode in the symbol after the feedback symbol of the configured slot. In one aspect, the apparatus 1300 may switch from the transmitting mode back to the receiving mode in the same symbol as the feedback symbol of the configured slot but after the end of transmission of the NACK.

The transmission component 1310 may be configured to transmit the NACK in the feedback symbol of the configured slot to a second device 1350. The reception component 1312 may be configured to receive the transport block of the data packet from the second device 1350.

The apparatus may include additional components that perform each of the blocks of the algorithm in the aforementioned flowcharts of FIGS. 11, 12, and/or 18. As such, each block in the aforementioned flowcharts of FIGS. 11, 12, and/or 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
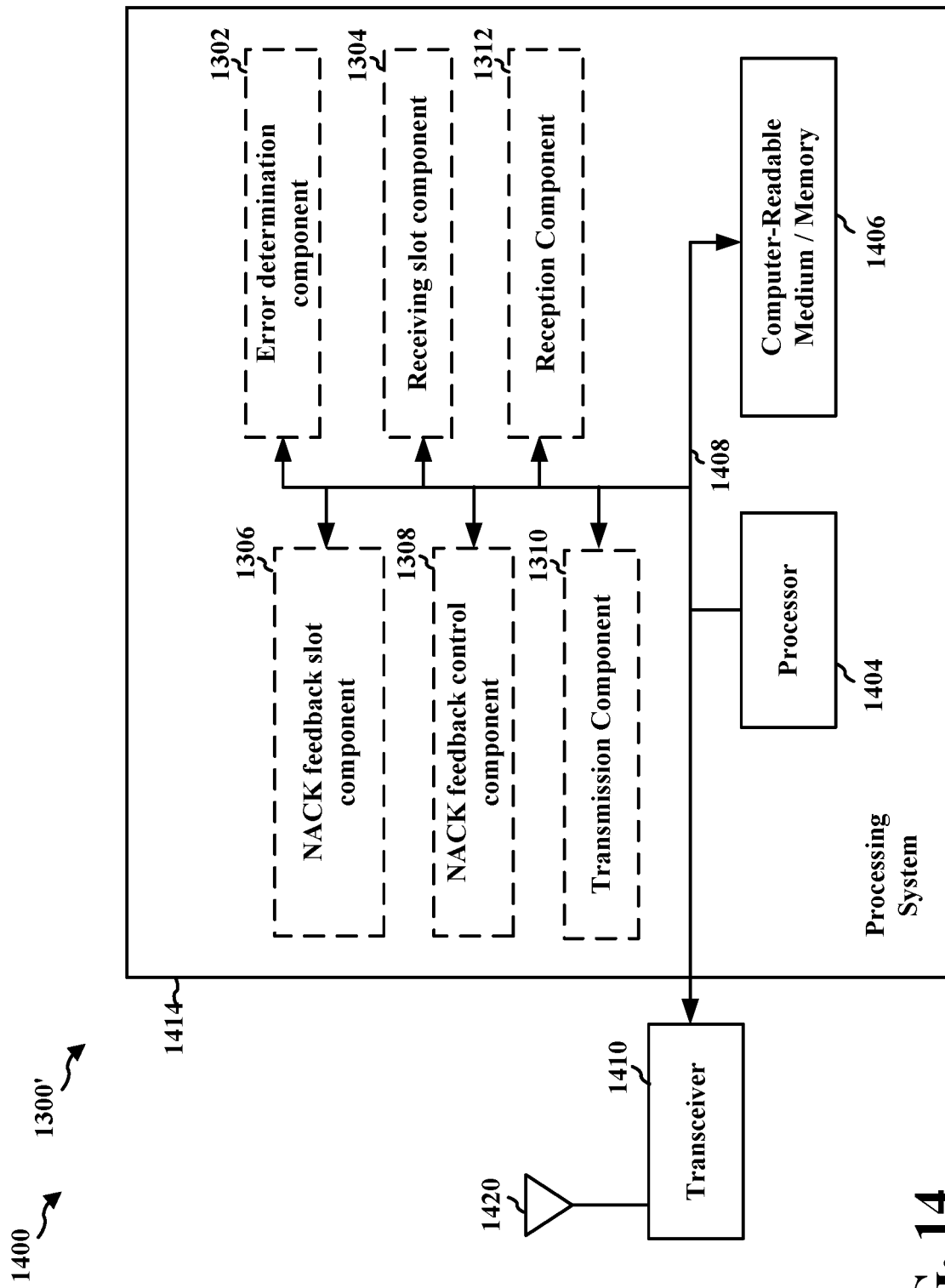
FIG. 14 is a diagram illustrating an example of a hardware implementation for an apparatus of a receiving UE employing a processing system in accordance with certain aspects of the disclosure.

FIG. 14 is a diagram illustrating an example of a hardware implementation 1400 for an apparatus 1300' of a receiving UE employing a processing system 1414 in accordance with certain aspects of the disclosure. The processing system 1414 may be implemented with a bus architecture, represented generally by the bus 1408. The bus 1408 may include any number of interconnecting buses and bridges depending on the specific application of the processing system 1414 and the overall design constraints. The bus 1408 links together various circuits including one or more processors and/or hardware components, represented by the processor 1404, the transceiver 1410, components 1304, 1306, 1308, 1310, 1312, and the computer-readable medium/memory 1406. The bus 1408 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1120, extracts information such as the received data packets, and provides the extracted information to the processing system 1414, specifically error determination component 1302. In addition, the transceiver 1410 receives information from the processing system 1414, specifically the NACK in the feedback symbol of the configured slot, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the components 1302, 1304, 1306, 1308, 1310, 1312. The components may be software components running in the processor 1404 configured to perform the stated processes/algorithm, resident/stored in the computer readable medium/memory 1406 for implementation by the processor 1404, one or more hardware components specifically configured to carry out the stated processes/algorithm, one or more hardware components coupled to the processor 1404, or some combination thereof. The processing system 1414 may be a component of the device 310 or the device 350 and may include the memory 376, 360 and/or at least one of the TX processor 316, 368, the RX processor 370, 356, and the controller/processor 375, 359. Alternatively, the processing system may comprise an entire UE.

In one configuration, the apparatus 1300' may include means for determining if a first data packet is received incorrectly. The means for determining if a first data packet is received incorrectly may be implemented by the error determination component 1302. The apparatus 1300' may include means for determining the end of the receiving slots. The means for determining the end of the receiving slots may be implemented by the receiving slot component 1304. The apparatus 1300' may include means for determining the slot for transmitting the NACKS to be a number of slots after the end of the one or more receiving slots. The means for determining the slot for transmitting the NACKS to be a number of slots after the end of the one or more receiving slots may be implemented by the NACK feedback slot component 1306. The apparatus 1300' may include means for transmitting a NACK in a feedback symbol of the configured slot. The means for transmitting a NACK in a feedback symbol of the configured slot may be implemented by the NACK feedback control component 1308.

The aforementioned means may be one or more of the aforementioned components of the apparatus 1300 and/or the processing system 1414 of the apparatus 1300' configured to perform the functions recited by the aforementioned means. As described supra, the processing system 1414 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 15:
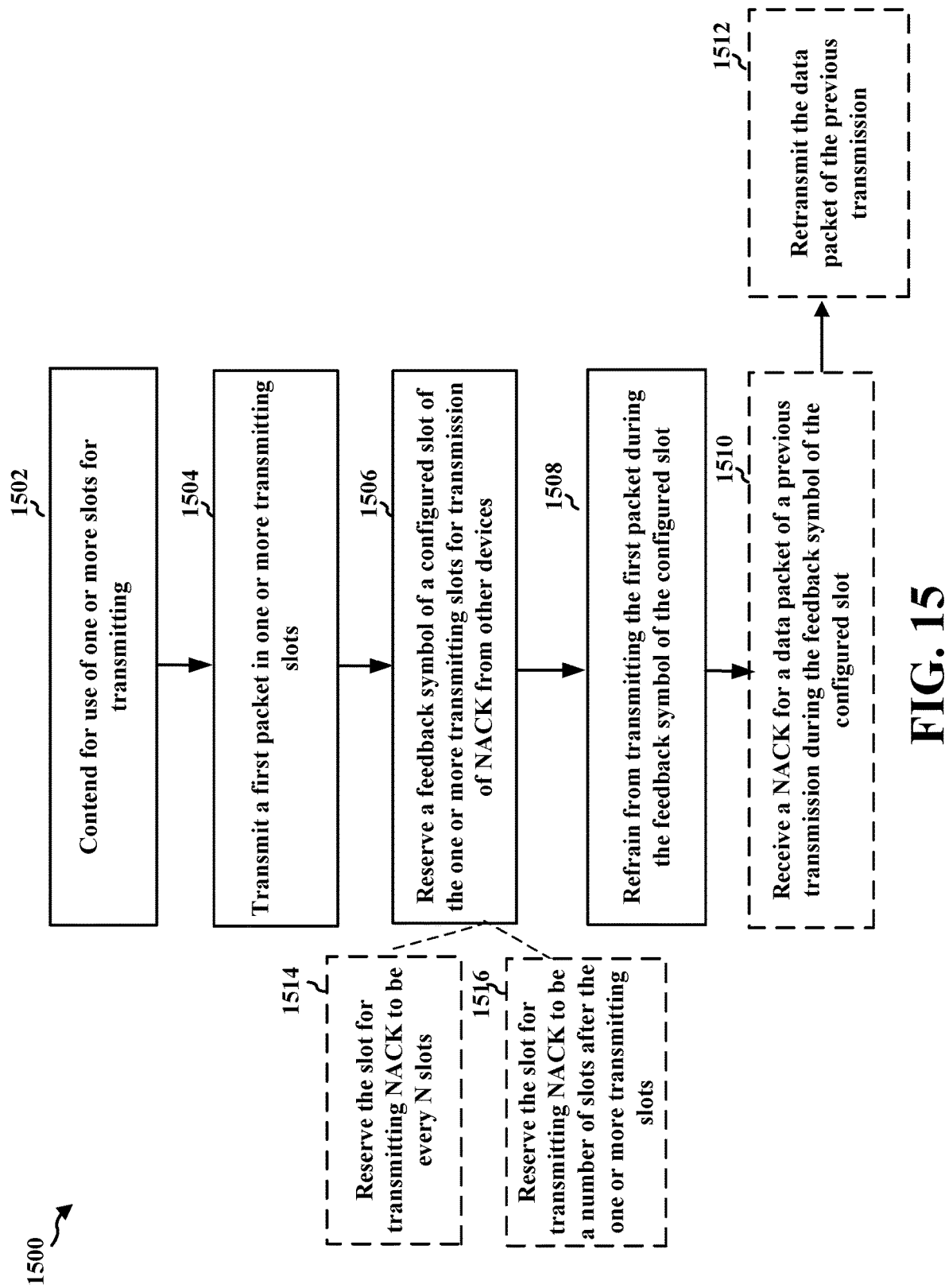
FIG. 15 is a flowchart of a method for transmitting multicast data packets and receiving NACK feedbacks from a receiving UE that may be implemented by a transmitting UE in accordance with certain aspects of the disclosure.

FIG. 15 is a flowchart of a method 1500 for transmitting data packets, e.g., multicast data packets, and receiving feedback from at least one receiving device. The method may be performed by a device engaged in V2V/V2X/D2D communication, e.g., UE or a component of a UE 104,410, 420,430; the device 350; the apparatus 1600, 1600'; the processing system 1714, which may include memory 1406 and one or more of RX processor 356, 370, TX processor 316, 368, or controller/processor 359, 375. Optional aspects are illustrated with a dashed line. The method may provide more reliable communication, by enabling communication devices engaged in TDD communication to more effectively receiving NACK feedback.

At 1502, the first device may contend for use of one or more slots of a TDD frame for transmitting, where each slot of the one or more slots includes a plurality of symbols. The contention may be performed, e.g., by the contention component 1602 of the apparatus 1600. For example, the first UE may transmit a LBT sequence during the first symbol of a slot. Other UEs may contend for the transmission resources by transmitting their LBT sequences. After performing the LBT sequence, the first device may use one transmitting slot or an aggregation of transmitting slots for transmitting control and a first data packet.

At 1504, the first device may transmit at least a portion the first data packet during the one or more transmitting slots. The transmission may be performed, e.g., by the transmission component 1612 and/or the data packet transmission control component 1608 of the apparatus 1600. The first device may transmit the first data packet as a multicast transmission to multiple receivers within a receiving distance of the first device.

At 1506, the first device may reserve a feedback symbol in a first transmitting slot of the one or more slots for reception of a NACK from one or more devices. Thus, the first device may reserve a feedback symbol of a configured slot for use by any UEs for transmitting a NACK in response to the UEs unable to correctly decode a data packet received in a previous transmission. The reservation may be performed, e.g., by the reservation component 1604 of the apparatus 1600. In one aspect, to accommodate NACK transmitting UEs without compromising the data rate of other UEs that do not transmit NACKs in the feedback symbol of the configured slot, the first device may fill a first symbol that is one symbol before the first feedback symbol and a second symbol that is one symbol after the feedback symbol with the portion of the first packet after filling the other symbols in the one or more slots. The other symbols of the aggregation of transmitting slots may be filled with code rate matched data from a buffer. For example, the first device may place data from the first packet in the other symbols in the one or more slots before placing data in the symbols adjacent to the feedback symbol. If additional data of the first packet remains, the first device may then place data in the symbol before the feedback symbol and the symbol after the feedback symbol. The first feedback symbol may include symbol thirteen of the first transmitting slot. The first symbol that is one symbol before the first feedback symbol may be symbol twelve of the first transmitting slot, and the second symbol that is one symbol after the first feedback symbol may be symbol fourteen of the first transmitting slot.

At 1514, the first device may reserve the feedback symbol for transmitting the NACK to be every N slots, e.g., such as described in connection with the example in FIG. 8. The reservation may be performed, e.g., by the reservation component 1604 of the apparatus 1600. In one aspect, dedicated NACK symbols after every N slots may be used for transmitting NACKs for data packets that were unsuccessfully decode in the previous N slots. The NACKs for the data packet transmitted in the N slots may be multiplexed and transmitted in the dedicated NACK symbol. For example, three symbols may be dedicated for NACK. The three symbols may include a first turnaround symbol to allow a receiving UE to switch from the receiving mode to the transmitting mode, a NACK feedback symbol for transmitting the NACK signals, and a second turnaround symbol to switch from the transmitting mode back to the receiving mode. In one aspect, N is configurable.

At 1516, the first device may reserve the feedback symbol for transmitting the NACKS in a configured slot that is a number of slots after the start of the current aggregation of transmitting slots or from the end of the previous transmission. The reservation may be performed, e.g., by the reservation component 1604 of the apparatus 1600. The reserved slot may be configurable to allow sufficient time for a receiving device to determine if the data packet is received in error during the previous transmission. In one aspect, the reserved slot may be the first slot of the one or more transmitting slots and the feedback symbol may be symbol 13. In one aspect, the reserved slot may be the second slot of the one or more transmitting slots and the feedback symbol may be symbol 2.

At 1508, the first device may refrain from transmitting the first feedback symbol of the transmitting slot. The transmission may be controlled, e.g., by data packet transmission control component 1608 of the apparatus 1600. In one aspect, the configured slot may be configured to be N slots after the end of one or more transmitting slots during which the first data packet was transmitted.

At 1510, the first device may listen to NACKs transmitted by any other UEs during the feedback symbol of the configured slot if the first UE also transmitted in a previous transmission. The first device may switch to a receiving mode after the one or more slots and may receive a first NACK from the one or more devices in a second feedback symbol of a slot after an end of the one or more slots. The first NACK may be received in response to the one or more devices receiving the first packet incorrectly during the one or more slots. In some aspects, the slot may include a first slot that follows the one or more slots, and the feedback symbol may include symbol thirteen of the first slot that follows the one or more slots. In some aspects, the slot may include a second slot that is separated from the one or more slots by at least one slot, and the feedback symbol may include a second symbol of the slot. The slot may be a configurable number of slots after the one or more slots. In some aspects, the first device may receive the first NACK during a receiving portion of the second feedback symbol of the slot. The listening or reception may be performed, e.g., by the NACK feedback reception component 1614 of the apparatus 1600. For example, a second UE may transmit a NACK on the feedback symbol of the configured slot to request the first UE to retransmit a data packet transmitted in the previous transmission because the second UE was not able to correctly receive the data packet in the previous transmission. If the first UE did not transmit in the previous transmission, the first device may ignore any NACKs received during the feedback symbol of the configured slot. The first device may resume transmitting the first packet after the feedback symbol of the configured slot.

At 1512, the first device may retransmit the data packet transmitted in the previous transmission if a NACK was received during the feedback symbol of the configured slot. The retransmission may be transmitted, e.g., by the data packet transmission control component 1608 and/or the transmission component 1612 of the apparatus 1600. In one aspect, the first device may retransmit the data packet in a subsequent transmission following the end of the current one or more transmitting slots.

Figure 16:
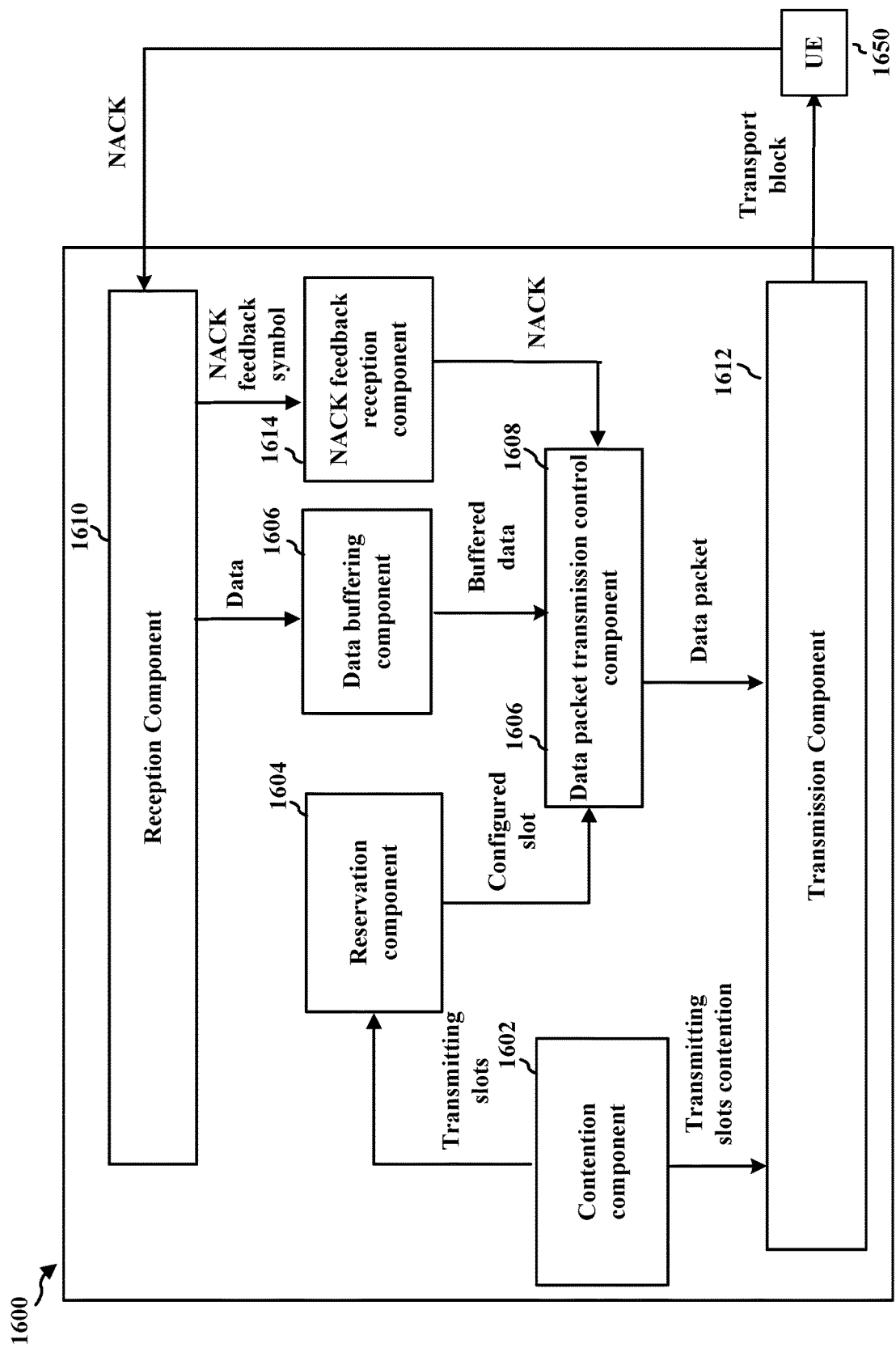
FIG. 16 is a conceptual data flow diagram illustrating the data flow between different modules/means/components in an example apparatus of a transmitting UE in accordance with certain aspects of the disclosure.

FIG. 16 is a conceptual data flow diagram illustrating the data flow between different modules/means/components in an example apparatus 1600 in accordance with certain aspects of the disclosure. The apparatus 1600 may be a UE or a component of a UE. The apparatus 1600 may include a transmission component 1612, a contention component 1602, a reservation component 1604, a data buffering component 1606, a data packet transmission control component 1608, and a reception component 1610.

The contention component 1602 may be configured to contend for access to transmission resources. For example, the contention component 1602 may be configured to transmit a LBT sequence during the first symbol of a slot. Other UEs may contend for the transmission resources by transmitting their LBT sequences. After performing the LBT sequence, the apparatus 1600 may use one transmitting slot or an aggregation of transmitting slots for transmitting control and a first data packet.

The reservation component 1604 may be configured to reserve a feedback symbol of a configured slot for use by any UEs for transmitting a NACK in response to the UEs unable to correctly decode a data packet received in a previous transmission. In one aspect, the reservation component 1604 may be configured to reserve a feedback symbol of the configured slot for transmitting the NACK to be every N slots. In one aspect, dedicated NACK symbols after every N slots may be used for transmitting NACKs for data packets that were unsuccessfully decode in the previous N slots. The NACKs for the data packet transmitted in the N slots may be multiplexed and transmitted in the dedicated NACK symbol. For example, three symbols may be dedicated for NACK. The three symbols may include a first turnaround symbol to allow a receiving UE to switch from the receiving mode to the transmitting mode, a NACK feedback symbol for transmitting the NACK signals, and a second turnaround symbol to switch from the transmitting mode back to the receiving mode. In one aspect, N is configurable. In one aspect, the reservation component 1604 may be configured to reserve a feedback symbol of the configured slot for transmitting the NACKS to be a number of slots after the start of the current aggregation of transmitting slots or from the end of the previous transmission. The reserve feedback symbol of the configured slot may be configurable to allow sufficient time for a receiving device to determine if a data packet is received in error during the previous transmission. In one aspect, the configured slot may be the first slot of the one or more transmitting slots and the feedback symbol may be symbol 13. In one aspect, the configured slot may be the second slot of the one or more transmitting slots and the feedback symbol may be symbol 2.

The data buffering component 1606 may be configured to buffer the data packet to be transmitted and to fill the symbols of the transmission slots with the buffered data packet. In one aspect, to accommodate NACK transmitting UEs without compromising the data rate of other UEs that do not transmit NACKs in the feedback symbol of the configured slot, the data buffering component 1606 may be configured to fill the symbols prior and after the feedback symbols in every slot after all other symbols in the aggregation of transmitting slots are filled with code rate matched data from a buffer.

The data packet transmission control component 1608 is configured to refrain from transmitting during the feedback symbol of the configured slot. In one aspect, the configured slot may be configured to be N slots after the end of one or more transmitting slots during which the first data packet was transmitted.

The NACK feedback reception component 1614 may be configured to listen for any NACKs transmitted by other UEs during the feedback symbol of the configured slot if the apparatus 1600 also transmitted in the previous transmission. The NACKs transmitted by other UEs may indicate to the apparatus 1600 to retransmit the data packet that was transmitted in the previous transmission because other UEs were not able to receive the data packet correctly. The NACK feedback reception component 1614 may provide any received NACKs to the data packet transmission control component 1608.

If the apparatus 1600 was transmitting prior to the feedback symbol of the configured slot, the data packet transmission control component 1608 may be configured to resume transmitting after the feedback symbol of the configured slot. If a NACK was received requesting retransmission of a data packet transmitted in a previous transmission, the NACK feedback reception component 1614 may retransmit the data packet in the current transmission slots, or in a subsequent aggregation of transmission slots.

The transmission component 1612 may be configured to transmit the transport block of the data packets to a second device 1650 such as another UE. The reception component 1610 may be configured to receive the NACK on the feedback symbol of the configured slot.

The apparatus may include additional components that perform each of the blocks of the algorithm in the aforementioned flowcharts of FIGS. 11 and 15. As such, each block in the aforementioned flowcharts of FIGS. 11 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
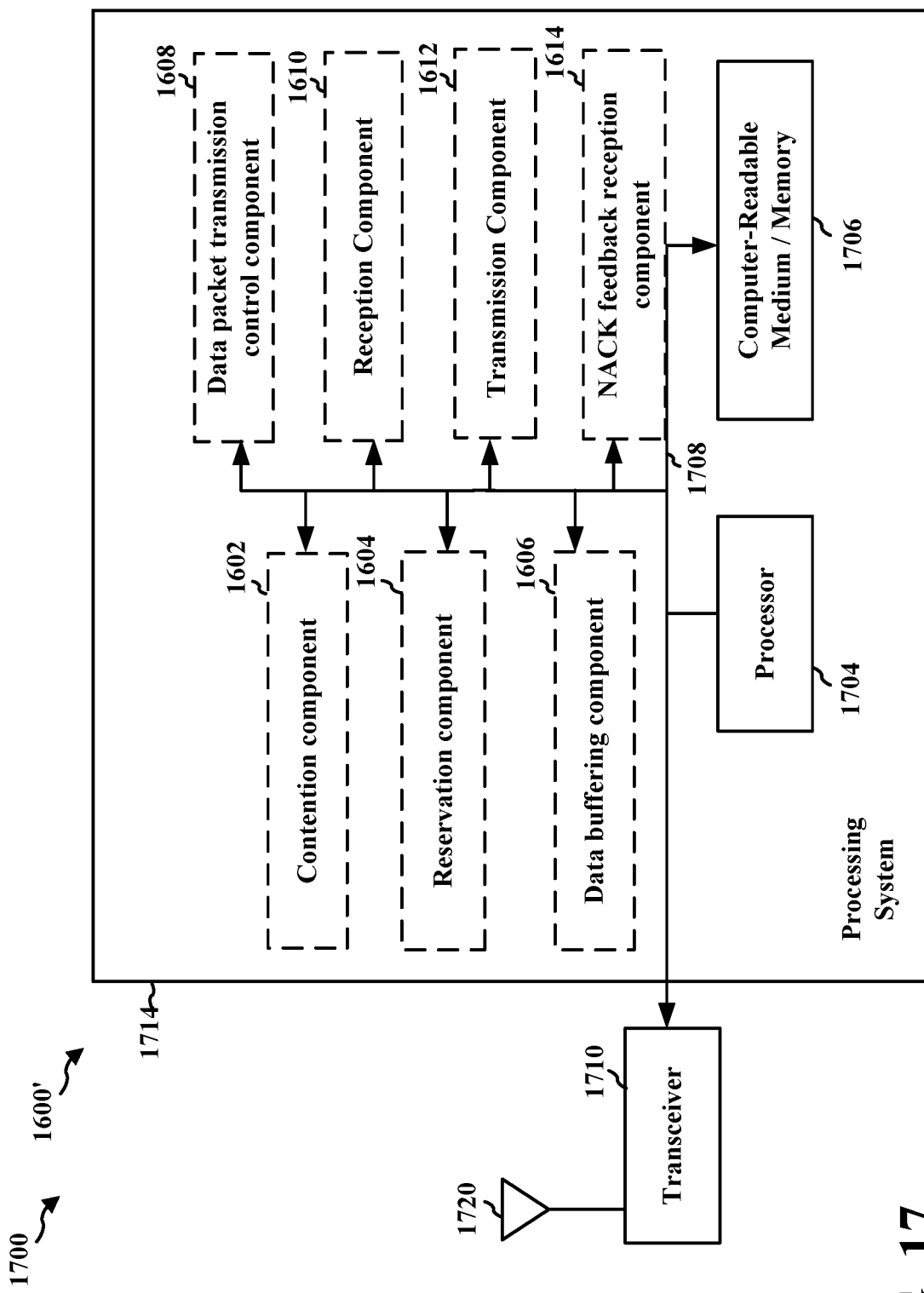
FIG. 17 is a diagram illustrating an example of a hardware implementation for an apparatus of a transmitting UE employing a processing system in accordance with certain aspects of the disclosure.

FIG. 17 is a diagram illustrating an example of a hardware implementation 1700 for an apparatus 1600' of a transmitting UE employing a processing system 1714 in accordance with certain aspects of the disclosure. The processing system 1714 may be implemented with a bus architecture, represented generally by the bus 1708. The bus 1708 may include any number of interconnecting buses and bridges depending on the specific application of the processing system 1714 and the overall design constraints. The bus 1708 links together various circuits including one or more processors and/or hardware components, represented by the processor 1704, the transceiver 1710, components 1602, 1604, 1606, 1608, 1610, 1612, 1614, and the computer-readable medium/memory 1706. The bus 1708 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information such as the NACK on the feedback symbol of the configured slot, and provides the extracted information to the processing system 1714. In addition, the transceiver 1710 receives information from the processing system 1714, specifically the data packets or the transport block, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1602, 1604, 1606, 1608, 1610, 1612, and 1614. The components may be software components running in the processor 1704 configured to perform the stated processes/algorithm, resident/stored in the computer readable medium/memory 1706 for implementation by the processor 1704, one or more hardware components specifically configured to carry out the stated processes/algorithm, one or more hardware components coupled to the processor 1704, or some combination thereof. The processing system 1714 may be a component of the device 310 or the device 350 and may include the memory 376, 360 and/or at least one of the TX processor 316, 368, the RX processor 370, 356, and the controller/processor 375, 359. Alternately, the processing system may comprise an entire UE.

In one configuration, the apparatus 1600' includes means for determining whether to contend for access to transmission resources. The means for determining whether to contend for access to transmission resources may be implemented by the contention component 1602. The apparatus 1600' may include means for configuring and reserving a feedback symbol of a configured slot for use by any UEs for transmitting a NACK. The means for configuring and reserving a feedback symbol of a configured slot for use by any UEs for transmitting a NACK may be implemented by the reservation component 1604. The apparatus 1600' may include means for buffering the data packet to be transmitted and for filling the symbols of the transmission slots with the buffered data packet. The means for buffering the data packet to be transmitted and for filling the symbols of the transmission slots with the buffered data packet may be implemented by the data buffering component 1606. The apparatus 1600' may include means for refraining from transmitting during the feedback symbol of the configured slot and for resuming transmitting after the feedback symbol of the configured slot. The means for refraining from transmitting during the feedback symbol of the configured slot and for resuming transmitting after the feedback symbol of the configured slot may be implemented by the data packet transmission control component 1608. The apparatus 1600' may include means for listening and receiving NACKs during the feedback symbol of the configured slots. The means for listening and receiving NACKs during the feedback symbol of the configured slots may be implemented by the NACK feedback reception component 1614. The aforementioned means may be one or more of the aforementioned components of the apparatus 1600 and/or the processing system 1714 of the apparatus 1600' configured to perform the functions recited by the aforementioned means. As described supra, the processing system 1714 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

The following examples are illustrative only and aspects thereof may be combined with any of the aspects of the previous discussions and/or embodiments or teachings described herein, without limitation.

Example 1 is a method of wireless communication by a first device, comprising receiving from a second device a first data packet in one or more receiving slots of a TDD frame that includes a plurality of slots, where a slot includes a plurality of symbols. The method further includes determining whether the first data packet is received incorrectly, waiting until the end of the one or more receiving slots, and transmitting to the second device a NACK in a NACK feedback symbol in a configured slot after the end of the one or more receiving slots in response to the determination that the first data packet is received incorrectly. In Example 2, the method of Example 1 further includes the first device receiving a second packet in the configured slot from a third device during a receiving mode, switching from the receiving mode to a transmitting mode during a first turnaround symbol of the plurality of symbols in the configured slot in order to transmit the first NACK in the NACK feedback symbol, where the first turnaround symbol comes one symbol before the NACK feedback symbol, and switching from the transmitting mode back to the receiving mode during a second turnaround symbol of the plurality of symbols of the configured slot, where the second turnaround symbol comes one symbol after the NACK feedback symbol. In Example 3, the method of any of Examples 1-2 further includes the first device switching to a transmitting mode to transmit a third packet in a slot following the configured slot after transmitting the first NACK in the NACK feedback symbol in the configured slot. In Example 4, the methods of any of Examples 1-3 further includes that the configured slot includes the first slot that follows the one or more receiving slots, the NACK feedback symbol includes symbol thirteen of the configured slot, the first turnaround symbol includes symbol twelve of the configured slot, and the second turnaround symbol includes symbol fourteen of the configured slot. In Example 5, the methods of any of Examples 1-4 further includes that the configured slot includes the second slot that is separated from the one or more receiving slots, the NACK feedback symbol includes the second symbol of the configured slot by at least one slot, the first turnaround symbol includes the first symbol of the configured slot, and the second turnaround symbols includes the third symbol of the configured slot. In Example 6, the methods of any of Examples 1-5 further includes that the configured slot is at a configurable number of slots after the one or more receiving slots. In Example 7, the methods of any of Examples 1-6 further includes the first device receiving a second packet in the configured slot from a third device during a receiving mode, switching from the receiving mode to a transmitting mode during a first turnaround portion of the NACK feedback symbol of the configured slot, transmitting the first NACK in a transmitting portion of the NACK feedback symbol of the configured slot during the transmitting mode, and switching from the transmitting mode back to the receiving mode during a second turnaround portion of the NACK feedback symbol of the configured slot. In Example 8, the methods of any of Examples 1-7 further includes that the NACK feedback symbol includes a larger sub-carrier spacing than a sub-carrier spacing of other symbols in the plurality of slots and the transmitting portion of the NACK feedback symbol is less than a symbol length of the NACK feedback symbol. In Example 9, the methods of any of Examples 1-8 further includes the first device receiving one or more additional data packets in the one or more receiving slots from one or more other devices, determining whether one or more of the additional data packets are received incorrectly to generate one or more additional NACKs corresponding to the one or more additional data packets, and transmitting to the one or more other devices the one or more additional NACKs along with the first NACK in the NACK feedback symbol in the configured slot in response to the determination that one or more of the additional data packets are received incorrectly. In Example 10, the methods of any of Examples 1-9 further includes that the number of the one or more receiving slots is configurable for receiving the first data packet and the one or more additional data packets. In Example 11, the methods of any of Examples 1-10 further includes that the NACK feedback symbol includes a symbol every N slots of the TDD frame where the NACK feedback symbol is dedicated to transmitting the NACK. In Example 12, the methods of any of Examples 1-11 further includes that the NACK includes one or more additional feedback bits transmitted in the NACK feedback symbol. In Example 13, the methods of any of Examples 1-12 further includes that the one or more additional feedback bits are transmitted by the first device for a unicast transmission. In Example 14, the methods of any of Examples 1-13 further includes that the one or more additional feedback bits include a reference signal that is transmitted by the first device on one of every N subcarriers of the NACK feedback symbol.

Example 15 is a system or apparatus including means for implementing a method or realizing an apparatus as in any of Examples 1-14.

Example 16 is a device including one or more processors and one or more memories in electronic communication with the one or more processors storing instructions executable by the one or more processors to cause the system or apparatus to implement a method as in any of Examples 1-14.

Example 17 is a non-transitory computer readable medium storing instructions executable by one or more processors to cause the one or more processors to implement a method as in any of Examples 1-14.

Example 18 is a method of wireless communication by a first device, comprising contending for use of one or more slots of a plurality of slots of a TDD frame for transmitting, where each slot of the one or more slots includes a plurality of symbols. The method further includes transmitting at least a portion of a first packet to one or more devices in one or more transmitting slots, reserving a first feedback symbol in a first transmitting slot of the one or more transmitting slots for transmission of a NACK from the one or more devices, and refraining from transmitting the first packet during the feedback symbol of the first transmitting slot. In Example 19, the method of Example 18 further includes the first device identifying a first symbol that comes one symbol before the first feedback symbol, identifying a second symbol that comes one symbol after the first feedback symbol, and filling the first symbol that is one symbol before the first feedback symbol and the second symbol that is one symbol after the first feedback symbol with the portion of the first packet after filling placing data in the other symbols in the one or more transmitting slots. In Example 20, the method of any of Examples 18-19 further includes that the first feedback symbol includes symbol thirteen of the first transmitting slot, the first symbol includes symbol twelve of the first transmitting slot, and the second symbol includes symbol fourteen of the first transmitting slot. In Example 21, the method of any of Examples 18-20 further includes the first device switching to a receiving mode after the one or more transmitting slots, and receiving a first NACK from the one or more devices in a second feedback symbol of a configured slot after the end of the one or more transmitting slots, where the first NACK is received in response to the one or more devices receiving the first packet incorrectly during the one or more transmitting slots. In Example 22, the method of any of Examples 18-21 further includes that the configured slot includes the first slot that follows the one or more transmitting slots, and the second feedback symbol includes symbol thirteen of the configured slot. In Example 23, the method of any of Examples 18-22 further includes that the configured slot includes the second slot that is separated from the one or more slots by at least one slot, and the second feedback symbol includes the second symbol of the configured slot. In Example 24, the method of any of Examples 18-23 further includes that the configured slot is at a configurable number of slots after the one or more transmitting slots. In Example 25, the method of any of Examples 18-24 further includes the first device receiving the first NACK during a receiving portion of the feedback symbol of the configured slot.

Example 26 is a system or apparatus including means for implementing a method or realizing an apparatus as in any of Examples 18-25.

Example 27 is a device including one or more processors and one or more memories in electronic communication with the one or more processors storing instructions executable by the one or more processors to cause the system or apparatus to implement a method as in any of Examples 18-25.

Example 28 is a non-transitory computer readable medium storing instructions executable by one or more processors to cause the one or more processors to implement a method as in any of Examples 18-25.

Example 29 is a method of wireless communication by a first device, comprising receiving from a second device a first data packet in one or more receiving slots of a TDD frame that includes a plurality of slots, where a plurality of devices contend for use of the plurality of slots for transmission, and where a slot includes a plurality of symbols. The method further includes determining whether the first data packet is received incorrectly, waiting until a set of dedicated symbols to transmit a NACK, and transmitting to the second device the first NACK in a NACK feedback symbol in the set of dedicated symbols after the end of the one or more receiving slots in response to the determination that the first data packet is received incorrectly. In Example 30, the method of Example 29 further includes that the set of dedicated symbols includes occurrences that are spaced by a number of slots. In Example 31, the method of any of Example 29-30 further includes that each occurrence of the set of dedicated symbols includes at least three symbols. In Example 32, the method of any of Example 29-31 further includes that the set of dedicated symbols is reserved by a communication system for feedback. In Example 33, the method of any of Example 29-32 further includes that the set of dedicated symbols includes symbols within one of the plurality of slots. In Example 34, the method of any of Example 29-33 further includes that the set of dedicated symbols includes standalone symbols outside of the plurality of slots. In Example 35, the method of any of Examples 29-34 further includes that the one or more receiving slots containing the first data packet for which the NACK is transmitted is offset from the set of dedicated symbols by one or more offset slots. In Example 36, the method of any of Examples 29-35 further includes that the one or more offset slots are configurable.

Example 37 is a system or apparatus including means for implementing a method or realizing an apparatus as in any of Examples 29-36.

Example 38 is a device including one or more processors and one or more memories in electronic communication with the one or more processors storing instructions executable by the one or more processors to cause the system or apparatus to implement a method as in any of Examples 29-36.

Example 39 is a non-transitory computer readable medium storing instructions executable by one or more processors to cause the one or more processors to implement a method as in any of Examples 19-36.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a first device, comprising:
   contending for use of one or more slots of a time division duplex (TDD) frame for transmitting, wherein each slot of the one or more slots includes a plurality of symbols;
   transmitting at least a portion of a first packet in the one or more slots;
   reserving a first feedback symbol in a first transmitting slot of the one or more slots for reception of a negative acknowledgement signal (NACK) from one or more devices; and
   refraining from transmitting the first packet during the first feedback symbol of the first transmitting slot.

2. The method of claim 1, further comprising:
   switching from a transmitting mode to a receiving mode during a first turnaround symbol in order to receive a second NACK in at least one feedback symbol after the one or more slots, wherein the first turnaround symbol comes one symbol before the at least one feedback symbol; and
   receiving the second NACK from the one or more devices in the at least one feedback symbol in a slot after an end of the one or more slots, wherein the second NACK indicates that the one or more devices received the first packet incorrectly during the one or more slots.

3. The method of claim 2, further comprising:
   switching from the receiving mode back to the transmitting mode during a second symbol that comes one symbol after the at least one feedback symbol; and
   transmitting a second data packet in the transmitting mode.

4. The method of claim 3, wherein the at least one feedback symbol comprises at least one NACK feedback symbol for receiving only NACK feedback.

5. The method of claim 2, wherein transmitting at least the portion of the first packet and receiving the second NACK comprises receiving and transmitting using device-to-device communication.

6. The method of claim 2, wherein the slot comprises a first slot that follows the one or more slots, and the at least one feedback symbol comprises symbol thirteen of the slot.

7. The method of claim 2, wherein the slot comprises a second slot that is separated from the one or more slots by at least one slot, and the at least one feedback symbol comprises a second symbol of the slot.

8. The method of claim 2, wherein the slot is at a configurable number of slots after the one or more slots.

9. The method of claim 2, further comprising:
   receiving the second NACK during a receiving portion of the at least one feedback symbol of the slot.

10. The method of claim 1, further comprising the first device filling a first symbol that is one symbol before the first feedback symbol and a second symbol that is one symbol after the first feedback symbol with the portion of the first packet after filling other symbols in the one or more slots.

11. The method of claim 10, wherein the first feedback symbol comprises symbol thirteen of the first transmitting slot, the first symbol comprises symbol twelve of the first transmitting slot, and the second symbol comprises symbol fourteen of the first transmitting slot.

12. A method for wireless communication by a first device, comprising:
receiving from a second device a first data packet in one or more receiving slots of a time division duplex frame;
determining whether the first data packet is received incorrectly;
waiting until a set of dedicated symbols to transmit a first negative acknowledgement signal (NACK); and
transmitting to the second device the first NACK in a NACK feedback symbol in the set of dedicated symbols after an end of the one or more receiving slots in response to determining that the first data packet is received incorrectly.

13. The method of claim 12, wherein the set of dedicated symbols comprises occurrences spaced by a number of slots.

14. The method of claim 13, wherein each occurrence of the set of dedicated symbols comprises at least three symbols.

15. The method of claim 12, wherein the set of dedicated symbols is reserved by a communication system for feedback.

16. The method of claim 12, wherein the set of dedicated symbols comprises symbols within one of the one or more receiving slots.

17. The method of claim 12, wherein the set of dedicated symbols comprises standalone symbols outside of the one or more receiving slots.

18. The method of claim 12, wherein the one or more receiving slots containing the first data packet for which the NACK is transmitted is offset from the set of dedicated symbols by one or more offset slots.

19. The method of claim 18, wherein the one or more offset slots are configurable.

20. An apparatus for wireless communication by a first device, comprising:
memory; and
at least one processor coupled to the memory and configured to:
contend for use of one or more slots of a time division duplex (TDD) frame for transmitting, wherein each slot of the one or more slots includes a plurality of symbols;
transmit at least a portion of a first packet in the one or more slots;
reserve a first feedback symbol in a first transmitting slot of the one or more slots for reception of a negative acknowledgement signal (NACK) from one or more devices; and
refrain from transmitting the first packet during the first feedback symbol of the first transmitting slot.

21. The apparatus of claim 20, wherein the at least one processor is further configured to:
switch from a transmitting mode to a receiving mode during a first turnaround symbol in order to receive a second NACK in at least one feedback symbol after the one or more slots, wherein the first turnaround symbol comes one symbol before the at least one feedback symbol; and
receive the second NACK from the one or more devices in the at least one feedback symbol in a slot after an end of the one or more slots, wherein the second NACK indicates that the one or more devices received the first packet incorrectly during the one or more slots.

22. The apparatus of claim 21, wherein the at least one processor is further configured to:
switch from the receiving mode back to the transmitting mode during a second symbol that comes one symbol after the at least one feedback symbol; and
transmit a second data packet in the transmitting mode.

23. The apparatus of claim 22, wherein the at least one feedback symbol comprises at least one NACK feedback symbol for receiving only NACK feedback.

24. The apparatus of claim 21, wherein transmission of at least the portion of the first packet and reception the second NACK comprises device-to-device communication.

25. The apparatus of claim 21, wherein the slot comprises a first slot that follows the one or more slots, and the at least one feedback symbol comprises symbol thirteen of the slot.

26. The apparatus of claim 21, wherein the slot comprises a second slot that is separated from the one or more slots by at least one slot, and the at least one feedback symbol comprises a second symbol of the slot.

27. The apparatus of claim 21, wherein the slot is at a configurable number of slots after the one or more slots.

28. The apparatus of claim 21, wherein the at least one processor is further configured to:
receive the second NACK during a receiving portion of the at least one feedback symbol of the slot.

29. The apparatus of claim 20, wherein the at least one processor is further configured to:
fill a first symbol that is one symbol before the first feedback symbol and a second symbol that is one symbol after the first feedback symbol with the portion of the first packet after filling other symbols in the one or more slots.

30. The apparatus of claim 29, wherein the first feedback symbol comprises symbol thirteen of the first transmitting slot, the first symbol comprises symbol twelve of the first transmitting slot, and the second symbol comprises symbol fourteen of the first transmitting slot.

* * * * *